US011687269B2

(12) United States Patent
Martinez Lerin

(10) Patent No.: US 11,687,269 B2
(45) Date of Patent: Jun. 27, 2023

(54) DETERMINING DATA COPY RESOURCES

(71) Applicant: Hitachi, Ltd., Tokyo (JP)

(72) Inventor: Pablo Martinez Lerin, Waltham, MA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/408,545

(22) Filed: Aug. 23, 2021

(65) Prior Publication Data
US 2023/0054058 A1  Feb. 23, 2023

(51) Int. Cl.
*G06F 3/06* (2006.01)
*H04L 43/16* (2022.01)
*G06F 9/50* (2006.01)
*H04L 43/0888* (2022.01)

(52) U.S. Cl.
CPC .............. *G06F 3/065* (2013.01); *G06F 3/067* (2013.01); *G06F 3/0613* (2013.01); *G06F 9/5027* (2013.01); *H04L 43/0888* (2013.01); *H04L 43/16* (2013.01)

(58) Field of Classification Search
CPC ......... G06F 3/065; G06F 3/067; G06F 3/0613
USPC ................................................. 711/162, 161
See application file for complete search history.

(56) References Cited

U.S. PATENT DOCUMENTS

| 8,121,966 | B2 | 2/2012 | Routray et al. | |
| 8,423,998 | B2* | 4/2013 | Isci | G06F 9/5077 718/1 |
| 8,600,952 | B2 | 12/2013 | Blitzer et al. | |
| 9,535,776 | B2 | 1/2017 | Klose | |
| 2014/0149350 | A1* | 5/2014 | Chen | H04L 67/1095 707/634 |
| 2014/0310219 | A1* | 10/2014 | Prahlad | G06F 3/0644 706/21 |
| 2015/0242263 | A1* | 8/2015 | Klose | G06Q 10/00 714/47.3 |
| 2016/0274793 | A1* | 9/2016 | Oashi | G06F 3/0683 |
| 2021/0405905 | A1* | 12/2021 | Wada | G06F 11/3485 |

\* cited by examiner

*Primary Examiner* — Than Nguyen
(74) *Attorney, Agent, or Firm* — Mattingly & Malur, PC

(57) ABSTRACT

In some examples, a computing device may determine an amount of pending data to copy over a network from a first storage system to a second storage system. Further, the computing device may determine an ingest speed based on a quantity of data received by the first storage system and a copy speed associated with one or more first computing resources associated with the first storage system. The computing device may determine an estimated time to copy at least a portion of the pending data to the second storage system to meet a data copy requirement. For instance, the estimated time may be based at least in part on the copy speed, the amount of pending data, and the ingest speed. In addition, at least one action may be performed based on the estimated time.

20 Claims, 16 Drawing Sheets

| Data Copy ID | Sender Storage System ID | Receiver Storage System ID |
|---|---|---|
| 1 | Sender storage system 1 | Receiver storage system 1 |
| 2 | Sender storage system 2 | Receiver storage system 2 |

FIG. 6

| Data Copy ID | Data Group ID | Data Pending | Sender Ingest Speed | RPO Goal |
|---|---|---|---|---|
| 1 | User data 1 | 22000 GB | 1000 GB/h | 9 hours |
| 1 | User data 2 | 18000 GB | 900 GB/h | 7 hours |
| 1 | System data | 2000 GB | 100 GB/h | 9 hours |
| 2 | User data | 30000 GB | 1400 GB/h | 6 hours |
| 2 | System data | 3000 GB | 100 GB/h | 6 hours |

FIG. 8

| Data Copy ID | Copy Speed | Sender Resources | Sender Speed Per Unit | Receiver Resources | Receiver Speed Per Unit |
|---|---|---|---|---|---|
| 1 | 2500 GB/h | 5 units | 500 GB/h | 4 units | 625 GB/h |
| 2 | 2000 GB/h | 4 units | 500 GB/h | 2 units | 1000 GB/h |

FIG. 9

| Data Copy ID | Sender Resources | Receiver Resources | Copy Speed | Pending Data Shrink Speed | RPO Margin | Data To Copy | Time To Reach RPO Goals |
|---|---|---|---|---|---|---|---|
| 1 | 5 units | 4 units | 2500 GB/h | 500 GB/h | 12000 GB | 30000 GB | 60 hours |

FIG. 10

| Data Copy ID | Sender Resources | Receiver Resources | Copy Speed | Pending Data Shrink Speed | RPO Margin | Data To Copy | Time To Reach RPO Goals |
|---|---|---|---|---|---|---|---|
| 1 | 20 units | 16 units | 10000 GB/h | 8000 GB/h | 16200 GB | 25800 GB | 3.2 hours |

FIG. 11

DETERMINING DATA COPY RESOURCES

BACKGROUND

A data storage system may include multiple computing devices and associated storage that may be used to store data for users. In some cases, storage systems may copy their data to other storage systems to achieve a redundant copy for protection and recovery in the event of a failure, disaster, or the like. As one example, a sender storage system and a receiver storage system may be configured such that when client applications write data to the sender storage system, the data is copied asynchronously to the receiver storage system as soon as possible with the assigned resources.

RPO (Recovery Point Objective) is one example of a parameter that defines the requirements for copying data to a redundant storage system. RPO is a time value that indicates the longest time that is acceptable to wait between the time a piece of data is received at the sender storage system until the time the piece of data is copied to the receiver storage system, such as to provide disaster recovery redundancy. Administrators may assign resources in the sender storage system and in the receiver storage system for the data copy process. Assigning these resources may be based on careful planning. Using too many resources may be too expensive and waste resources. On the other hand, using too few resources may not allow the RPO goal to be achieved because data is written to the sender storage system faster than the data is copied to the receiver storage system.

SUMMARY

In some implementations, a computing device may determine an amount of pending data to copy over a network from a first storage system to a second storage system. Further, the computing device may determine an ingest speed based on a quantity of data received by the first storage system and a copy speed associated with one or more first computing resources associated with the first storage system. The computing device may determine an estimated time to copy at least a portion of the pending data to the second storage system to meet a data copy requirement. For instance, the estimated time may be based at least in part on the copy speed, the amount of pending data, and the ingest speed. In addition, at least one action may be performed based on the estimated time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates an example data copy information data structure according to some implementations.

FIG. 8 illustrates an example data pending to be copied data structure according to some implementations.

FIG. 9 illustrates an example copy speed data structure according to some implementations.

FIG. 10 illustrates an example RPO goal estimation data structure according to some implementations.

FIG. 11 illustrates an example RPO goal estimation data structure according to some implementations.

DESCRIPTION

Figure 1:
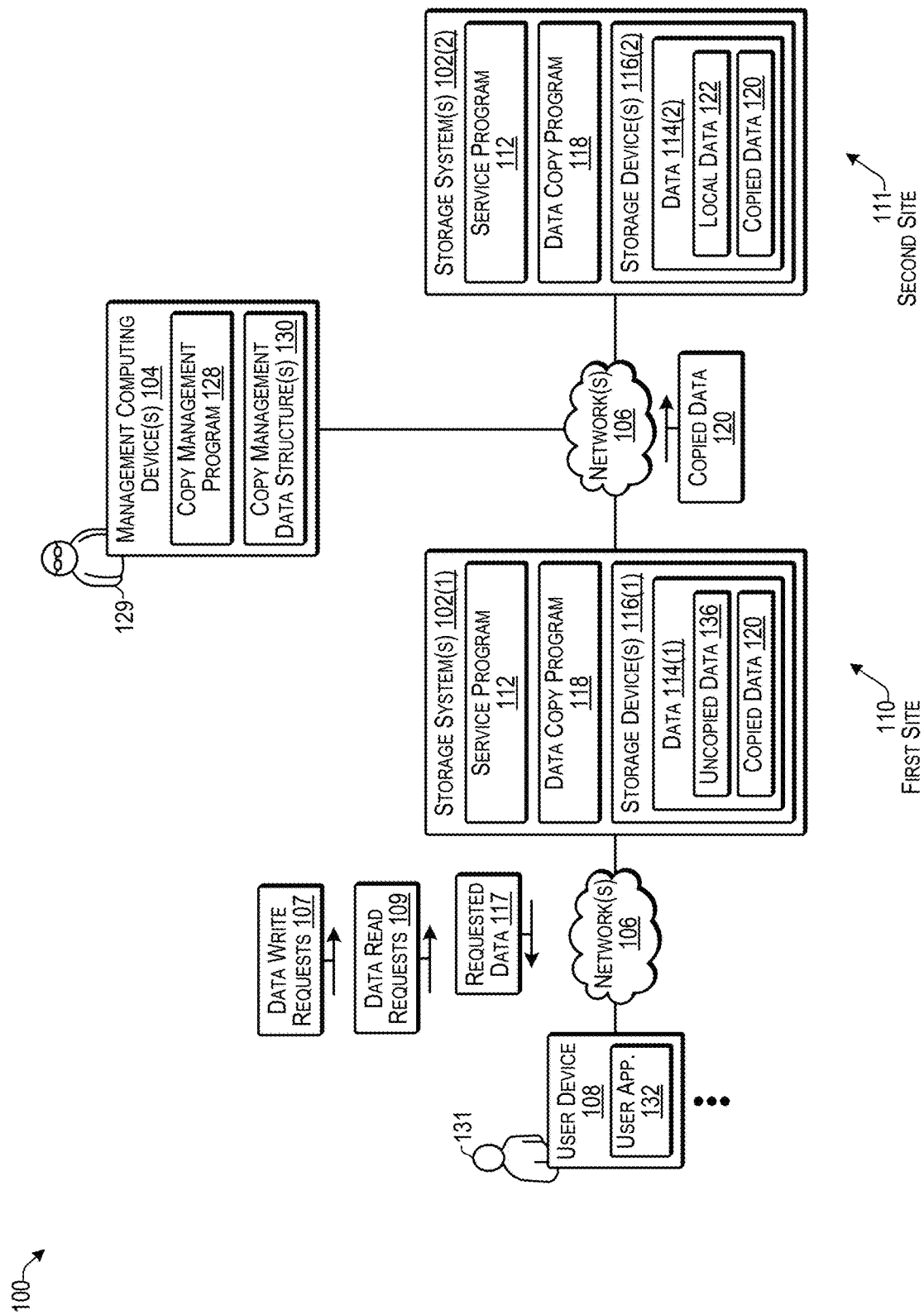
FIG. 1 illustrates an example architecture of a system able to perform data copying between storage systems according to some implementations.

Some implementations herein are directed to techniques and arrangements for disaster recovery configurations for storage systems that are able to handle unexpected large amounts of data pending to be copied to another storage system. Examples include a disaster recovery technique and arrangement that can determine the resources for copying data in a storage system for meeting a specified RPO. The disaster recovery examples herein may include discovering computing resources, such as in an existing computing infrastructure and, based on utilization information and disaster recovery requirements, determining a plan to comply with a data copy requirement, such as a specified RPO goal.

Examples herein are able to determine additional resources for catching up to a specified RPO goal or other data copy requirement, such as following an outage at a sender storage system, at a receiver storage system, or an outage of a network connecting the two. For instance, when copying data is able to resume, a computing device may determine the amount of uncopied data pending to be copied from the sender storage system to the receiver storage system. In addition, the computing device may determine the recent average data ingest speed at the sender storage system and the recent copy speed between the sender storage system and the receiver storage system. Further, the computing device may estimate the copy speed per unit of resource at the sender storage system site and the receiver storage system site and may determine how long it will take to reach the specified RPO goal when adding different amounts of additional resources to the data copy operation.

Based on the determined time, the computing device may take at least one action, e.g., presenting recommended resource deployment information on a user interface of an administrator, automatically deploying additional resources to reduce the estimated amount of time for achieving the RPO goal, or the like.

Implementations herein are able to take into account the amount of data pending to be copied, which may unexpectedly grow very large in a short amount of time in the event of issues such as an outage of the network between a sender storage system and a receiver storage system, or in the event of a failure in the receiver storage system or the sender storage system. For instance, in conventional storage systems, such unexpected brief situations may not be reflected in long-term utilization statistics or resource allocations, and can lead to a failure to fulfill the disaster recovery requirements such as a predetermined RPO goal. Examples herein may assign additional resources and/or may enable an administrator to assign additional resources, beyond the resources in an existing information technology infrastructure, to shorten the time required to return to a normal condition.

As one example, a system herein may copy data between storage systems, such as may be located at different geographical locations to enable disaster recovery or other failure recovery. For instance, a sender storage system at a first site may receive and store data from clients and may copy the data to one or more receiver storage systems at one or more second sites, respectively. In some examples, the data may include data received from client computing devices in write requests or the like. For instance, the data may include user data, such as content of documents, audio content, video content, images, and so forth. The data may also include system data generated by the storage system, such as to manage the storage system users, manage storage configurations, such as servers and containers, manage other storage information, and the like. The sender storage system may send the data (e.g., the user data and the system data) to the receiver storage system to provide redundancy against data loss and/or data unavailability should there be a failure in the sender storage system. The sender storage system and the receiver storage system can be at different sites, such as at different geographic locations, in different availability zones, or the like, so as to reduce the risk of a failure affecting both the sender storage system and the receiver storage system.

A management computing device may predict the time to achieve an RPO goal for sending data from a sender storage system to a receiver storage system using a given amount of resources. The prediction may take into consideration the occurrence of an abrupt increase in the amount of data pending to be copied. The computing device may determine a length of time a selected configuration may take to reach a specified RPO goal using different amounts of resources and may determine the resources to use for achieving the specified RPO. In addition, the computing device may track the amount of resources used for copying the data and the amount of data still waiting to be copied, and may determine additional resources that may be expended to decrease the time for reaching the specified RPO. As one example, resources may be repurposed from other tasks for assisting in copying the data from the sending site to the receiving site. As another example, the system may temporarily obtain additional computing resources from a cloud computing platform that provides such resources on a commercial basis Implementations herein are applicable to systems that copy data between two or more scalable storage systems and can be used for both Active/Passive and Active/Active disaster recovery.

For discussion purposes, some implementations are described in the environment of at least two storage systems in communication with each other for copying data therebetween. However, implementations herein are not limited to the particular examples provided, and may be extended to other types of computing system architectures, other types of storage environments, other types of client configurations, other types of data, and so forth, as will be apparent to those of skill in the art in light of the disclosure herein.

FIG. 1 illustrates an example architecture of a system 100 able to perform data copying between storage systems according to some implementations. The system 100 includes one or more first storage systems 102(1) that are able to communicate with one or more second storage systems 102(2) and one or more management computing devices 104 through one or more networks 106. Further, at least the first storage systems 102(1) are able to communicate over the network(s) 106 with one or more user computing devices 108, which may be any of various types of computing devices, as discussed additionally below.

The one or more networks 106 may include any suitable network, including a wide area network (WAN), such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, a direct wired connection, or any combination of the foregoing. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail.

In some cases, the network(s) 106 may include a frontend network for transmitting communications, such as data write requests 107 and data read requests 109, between the user device(s) 108 and at least the first storage system(s) 102(1). Further, in some examples, the network(s) 106 may include a backend network for transmitting communications between the storage systems 102(1) and 102(2). In addition, the network(s) 106 may include a management network for enabling communication between the management computing device(s) 104 and the storage systems 102. Regardless of the network configuration, the storage systems 102(1) and 102(2), the user device(s) 108, and the management computing device(s) 104 are able to communicate over the one or more networks 106 using wired and wireless connections, or combinations thereof.

In the illustrated example, the one or more first storage systems 102(1) are associated with a first site 110 and the one or more second storage systems 102(2) are associated with a second site 111. In some examples, the sites 110 and 111 may be geographically remote from each other such as to protect the stored data against a disaster or the like in other examples, rather than being geographically remote the sites 110 and 111 may be geographically near to each other or at the same geographical location but otherwise able to provide redundancy protection in the event of failure of the one of the site 110, 111, such as by being located on a different server cluster, different network connection, different electrical circuit, or the like.

As one example, the system 100 may employ an active/passive disaster recovery strategy in which the user devices 108 write data only to the first site 110, and the second site 111 receives a copy of the data for disaster recovery purposes. In other examples, such as discussed additionally below with respect to FIG. 2, an active/active disaster recovery strategy may be employed in which user devices 108 may write data to both the first site 110 and the second site 111, and each site 110, 111 receives a copy of the data from the other site 110, 111. Further, while only two sites are illustrated in this example, more sites may be employed in other examples, and, for instance, a storage system at one site may copy its data to multiple storage systems at different multiple sites, respectively.

The storage systems 102(1) and 102(2) may each include one or more servers or any other suitable computing devices, as discussed additionally below, e.g., with respect to FIG. 4. The storage systems 102(1) and 102(2) may each include a service program 112 that may be executed on one or more of the storage systems 102(1) and 102(2) at each site 110 and 111, respectively, to store data 114(1) and 114(2), respectively, on storage devices 116(1) and 116(2) associated with the storage system(s) 102(1) and 102(2), respectively. In some cases, the storage devices 116(1) and 116(2) may include arrays of storage devices, while in other examples, the storage devices 116(1) and/or 116(2) may be storage devices that are included in, or otherwise associated with, individual servers of the storage systems 102(1) and 102(2), respectively. Furthermore, the storage devices 116(1) employed at the first site 110 may be of a different type, configuration, etc., from the storage devices 116(2) employed at the second site 111. Numerous other possible configurations and variations of the storage devices 116(1) and 116(2) will be apparent to those of skill in the art having the benefit of the disclosure herein.

The service program 112 may enable the storage systems 102(1) and 102(2) to respond to the data write requests 107 from the user device(s) 108, such as for storing user data as a portion of the data 114. The service program 112 may also provide users with requested data 117, such as in response to the data read requests 109. Further, the service program 112 may create metadata and other system data that is related to the user data and which may also be included in the data 114(1) and 114(2). For instance, the system data may include storage configurations, container names, storage locations, storage paths, data storage life, data protection level, and the like, for each stored data object or other stored data included in the data 114. The service program 112 may configure the storage system(s) 102(1) and/or 102(2) to perform various other functions, such as for providing archiving, storage protection levels, storage class hierarchies, disaster recovery, garbage collection, and so forth.

Figure 2:
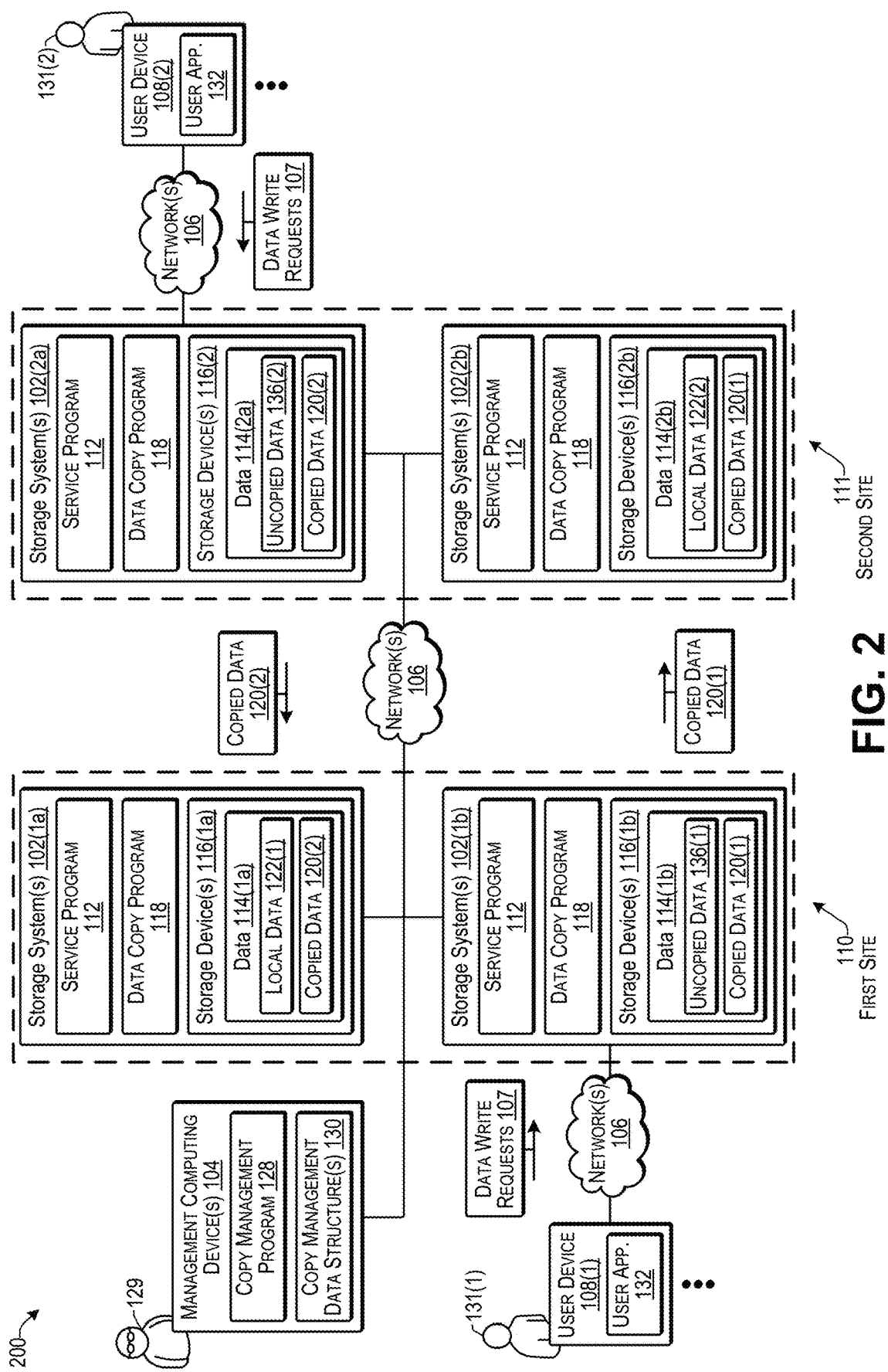
FIG. 2 illustrates an example architecture of a system able to perform data copying between storage systems according to some implementations.

In addition, one or more of the storage systems 102(1) and 102(2) at each site 110 and 111, respectively, may include a data copy program 118 that may be executed on individual ones of the storage systems 102(1) and 102(2) to enable one or more of the respective storage systems 102(1) and 102(2) to copy the data 114 from the first storage system 102(1) to the second storage system 102(2) (and/or vice versa in other examples, such as discussed with respect to FIG. 2), such as for providing redundancy of the data against disaster or other failure at the first site 110. For example, when the storage system 102(1) receives data from a user device 108 in a data write request 107, the storage system 102(1) may store the received data on the storage device(s) 116 and may mark the data as pending to be copied to the storage system(s) 102(2).

Accordingly, the data copy program 118 may cause the storage system(s) 102(1) to send copied data 120 to the second storage system(s) 102(2). For instance, the storage system(s) 102(1) may first send any data that is older than the specified RPO goal for the data. Otherwise, the first storage system(s) 102(1) may send the pending data on a first-in-first-out basis, or the like. Typically, the storage system(s) 102(1) may have sufficient resources to copy data faster than data is ingested at the sender storage system(s) 102(1) so as to maintain a specified RPO goal. However, when data copy stops for some reason, the data pending to be copied may continue to grow even though the storage system(s) 102(1) is not able to copy the data to the receiver storage system(s) 102(2).

The second storage system(s) 102(2) may include the copied data 120 received from the first storage system(s) 102(1) as part of its data 114(2). In some cases, the data 114(2) stored by the second storage system(s) 102(2) may further include local data 122, such as in the case of an active/active strategy, as discussed below with respect to FIG. 2. For example, the local data 122 may include user data that is stored by one or more of the user devices 108 directly to the second storage system(s) 102(2), rather than just copied data 120 that is copied from the first storage system(s) 102(1) to the second storage system(s) 102(2). The local data 122 may further include system data corresponding to the local user data and system data generated by the second storage system(s) 102(2) related to the copied data 120.

The management computing device(s) 104 may execute a copy management program 128 that may be used by an administrator 129 for managing at least the data copy operations within the system 100. For example, the administrator 129 may use the copy management program 128 to manually assign more resources to the storage systems 102 and/or management computing devices 104 to the system 100, such as based on information received from the copy management program 128. As discussed below, the copy management program 128 may employ one or more copy management data structures 130 for determining whether to assign additional resources to the data copy operation, and if so, what resources to assign. Additionally, while the copy management program 128 is illustrated as being installed on the management computing device 104 in this example, in other examples, the copy management program 128 may be installed on one or more of the storage systems 102 instead or in addition. Furthermore, the administrator 129 may be responsible for other configuration and management operations for the storage system(s) 102(1) and 102(2) in the system 100 for ensuring proper operation, as is known in the art.

Each user device 108 may be any suitable type of computing device such as a desktop, laptop, tablet computing device, mobile device, smart phone, wearable device, and/or any other type of computing device able to send data over a network. Users 131 may be associated with user devices 108, respectively, such as through a respective user account, user login credentials, or the like. Additionally, the user devices 108 may be able to communicate with the storage systems 102 through the one or more networks 106 or through any other suitable type of communication connection.

Further, each user device 108 may include a respective instance of a user application 132 that may execute on the respective user device 108, such as for communicating with the service program 112, e.g., for sending the data write requests 107 for storing user data with the storage system(s)

102 and/or for sending data read requests 109 for receiving requested data 117 from the storage system(s) 102. In some cases, the user application 132 may include a browser or may operate through a browser, and the service program 112 may include a web application (not shown in FIG. 1) for enabling the user 131 to access data 114 through one of the storage systems 102. Alternatively, in other cases, the user application 132 may include any other type of application having communication functionality enabling communication with the service program 112 over the one or more networks 106.

In the system 100, the users 131 may store data to, and receive data from, the storage systems 102 that their respective user devices 108 are in communication with. Accordingly, one or more of the storage systems 102 may provide local storage for one or more of the users 131 and their respective user devices 108. For instance, users 131 may typically interact with storage systems 102 located at a site that is geographically close to a location of the respective user 131. During steady state operation there may be multiple users 108 periodically communicating with respective ones of the storage systems 102 for storing and retrieving data.

In the example of FIG. 1, suppose that during normal operation, the storage system(s) 102(1) at the first site 110 send a certain amount of copied data to the storage system(s) 102(2) at the second site 111, such as periodically, when received, when a certain threshold amount of data is reached, or based on some other trigger, to meet a specified RPO goal. In this example, suppose that the data copy function ceases, such as due to a network failure, a failure at the second site 111, or a failure at the first site 110. Further, suppose that the user devices 108 continue to store data to the storage system(s) 102(1) at the first site 110. In this situation, uncopied data 136 may accumulate at the storage system(s) 102(1) at the first site 110. If the data copying outage lasts for some time, a large amount of uncopied data 136 may be accumulated at the first site 110, which causes a backlog in data copying and which may prevent the storage system(s) 102(1) from achieving an RPO goal for protecting the uncopied data 136 from data loss should a disaster occur at the first site 110.

To address this problem, implementations herein provide a technical solution for determining how to more quickly and efficiently achieve the RPO goal for protecting against data loss. For example, the copy management program 128 may be executed on the management computing device 104 (or other suitable computing device) to determine an amount of pending uncopied data 136 to be copied from the storage system(s) 102(1) at the first site 110 to the storage system(s) 102(2) at the second site 111. The management computing device 104 may further determine an ingest speed for the data at the storage system(s) 102(1), and may determine an amount of data able to be copied by the current computing resources already performing the data copy operations. The management computing device 104 may further determine an estimated amount time for copying the pending uncopied data 136 to the storage system(s) 102(2) based on the current computing resources, the amount of pending uncopied data 136, the ingest speed, and the specified data copy RPO goal. Based on the estimated amount of time, the management computing device 104 may perform at least one action, such as presenting a user interface to the administrator that identifies the selected additional resources for achieving the RPO goal at an earlier time. Alternatively, as another example, the management computing device may automatically assign the selected additional resources, such as by sending one or more control signals to the selected resources to cause the selected resources to participate in the data copy operations. Numerous variations will be apparent to those of skill in the art having the benefit of the disclosure herein.

FIG. 2 illustrates an example architecture of a system 200 able to perform data copying between storage systems according to some implementations. The system 200 may correspond to the system 100 discussed above with respect to FIG. 1. In this example, the system 200 includes storage system(s) 102(1a) and storage system(s) 102(1b) at the first site 110, and storage system(s) 102(2a) and storage system(s) 102(2b) at the second site 111. The storage system 102(1a) includes storage device(s) 116(1a) storing data 114(1a), and the storage system 102(1b) includes storage devices 116(1b) storing data 114(1b). The storage system 102(2a) includes storage device(s) 116(2a) storing data 114(2a), and the storage system 102(2b) includes storage devices 116(2b) storing data 114(2b). One or more first users 131(1) send data write requests 107 to the storage system(s) 102 at the first site 110 and one or more second users 131(2) send data write requests 107 to the storage systems 102 at the second site 111. In this example, suppose that the storage system(s) 102(1b) is configured to copy data from the first site 110 to the storage system(s) 102(2b) at the second site Similarly, the storage system(s) 102(2a) is configured to copy data from the second site 111 to the storage system(s) 102(1a) at the first site 110.

Should the network connection between the two sites 110, 111 be lost, or if a failure occurs at one of the sites 110 or 111 to otherwise cause data copying between the sites 110, 111 to cease, then uncopied data may accumulate at both the first site 110 and the second site 111. For instance, the first site 110 may accumulate uncopied data 136(1) in addition to the copied data 120(1), which together may correspond to at least part of the local data 122(1). Similarly the second site 111 may accumulate uncopied data 136(2) in addition to the copied data 120(2), which together may correspond to at least part of the local data 122(2).

In this example, similar to the example discussed above with respect to FIG. 1, the copy management program 128 may be executed on the management computing device 104 or other suitable computing device to determine an optimal configuration of resources for each site 110 and 111 to enable the respective sites to more quickly return to the specified RPO goal for each site 110 and 111. For example, the management computing device 104 may determine an amount of pending uncopied data 136(1) and 136(2) at each of the first site 110 and the second site 111, respectively. The management computing device 104 may further determine an ingest speed for the data at the sender storage system(s) 102 at the first site 110 and the second site 111, respectively, and may determine an amount of data able to be copied by the current computing resources already performing the data copy operations at each of the first site 110 and the second site 111. The management computing device 104 may further determine an estimated amount time for copying the pending uncopied data 136(1) to the storage system(s) 102(2b) based on the current computing resources at the first site 110, the amount of pending uncopied data 136(1), the ingest speed at the first site 110, and the specified data copy RPO goal for the first site 110. Similarly, the management computing device 104 may determine an estimated amount time for copying the pending uncopied data 136(2) to the storage system(s) 102(1a) based on the current computing resources at the second site 111, the amount of pending uncopied data 136(2), the ingest speed at the second site 111, and the specified data copy RPO goal for the second site 111.

Based on the estimated amount of time determined for each site 110 and 111, the management computing device 104 may perform at least one action, such as presenting selected resources for each site to an administrator 129, or automatically assigning selected resources to perform data copy functions at each site 110, 111, or the like.

Furthermore, while several example configurations of systems 100 and 200 are described with reference to FIGS. 1 and 2, respectively, numerous other configurations will be apparent to those of skill in the art having the benefit of the disclosure herein. For instance, in the examples of FIGS. 1 and 2, the storage system(s) 102 and the management computing device 104 are illustrated as separate computing devices. However, in other examples, management computing device 104 may be implemented on one or more of the storage systems 102. Additionally, in some alternative examples, the storage systems 102(1) and 102(2) may be implemented on a single physical computing device that assigns different resources for the first storage system(s) 102(1) (sender) and the second storage system(s) 102(2) (receiver). As another example, the storage systems 102(1) and 102(2) may be implemented as part of a pool of virtual machines and as part of a pool of containers. Additionally, as still another example, the storage systems 102(1) and/or 102(2) may be implemented as a cluster of physical servers where the data is stored in a distributed manner across the storage devices 116.

Figure 3:
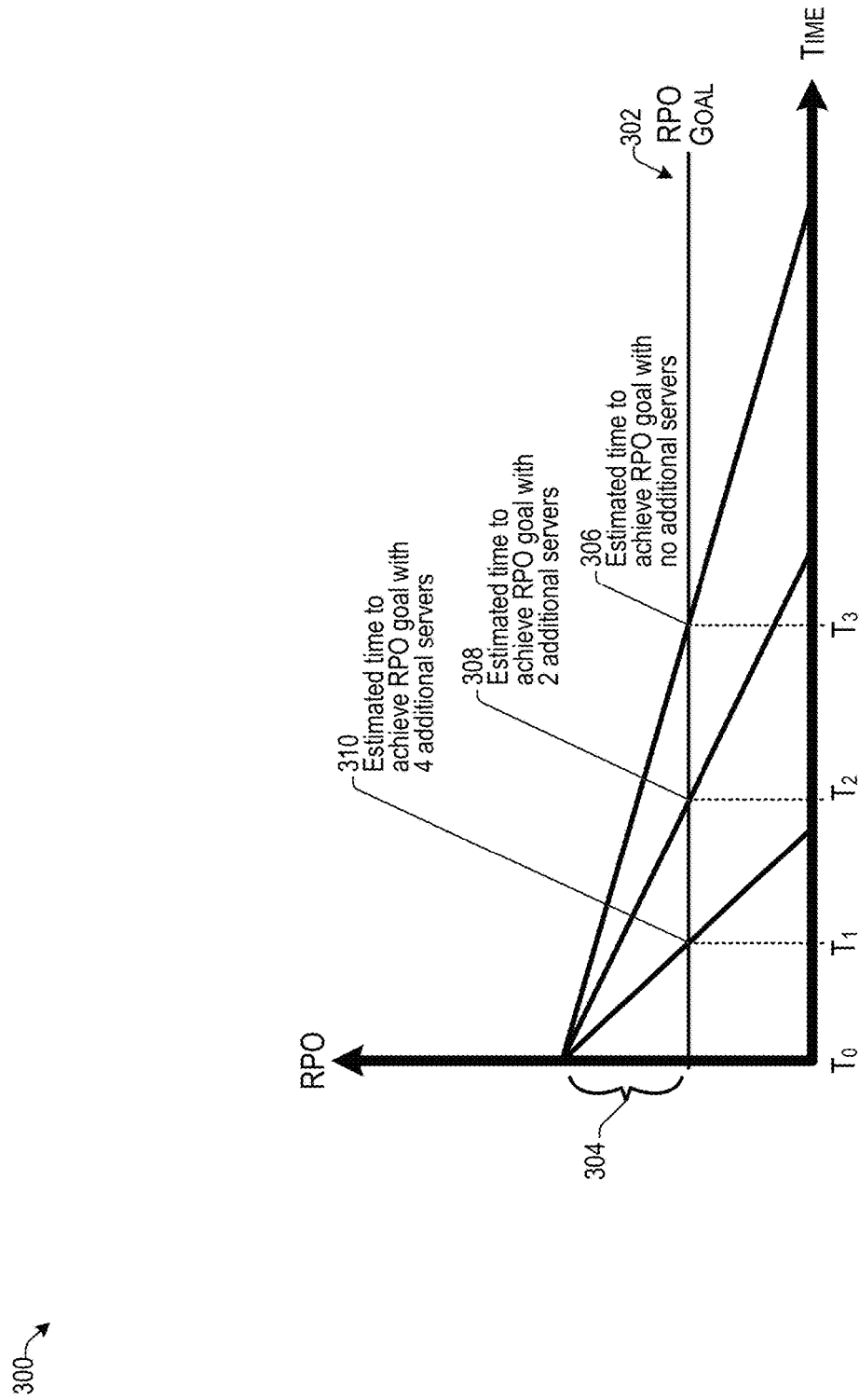
FIG. 3 illustrates an example of determining whether to assign additional resources for achieving an RPO goal following a data copy slowdown or stoppage according to some implementations.

FIG. 3 illustrates an example of determining whether to assign additional resources for achieving an RPO goal following a data copy slowdown or stoppage according to some implementations. In this example, a graph 300 includes RPO on the Y-axis and time on the X-axis. As mentioned above, RPO (Recovery Point Objective) is the maximum targeted period for which it might be permissible for data to be lost from the system 100, 200, such as due to a disaster or the like. For example, different types of industries and different types of data may have significantly different RPO specifications. In some implementations herein, RPO may be specified on a data type granularity, user type granularity, service type granularity, a site granularity, or the like.

In this example, suppose that the specified RPO goal for a site is as indicated at 302. Furthermore, suppose that following a slowdown or cessation of data copying, a site has a backlog of accumulated uncopied data of an amount corresponding to 304 at time To. Using the techniques discussed above, the management computing device 104 may determine estimated amounts of time for achieving the specified RPO goal 302. For instance, if no additional resources are allocated, the management computing device 104 estimates the specified RPO goal 302 will be achieved at time $T_3$, as indicated at 306; if two additional servers are allocated to the data copy operations, the specified RPO goal 302 is estimated to be achieved at time $T_2$, as indicated at 308; and if four additional servers are allocated to the data copy operations, the specified RPO goal 302 is estimated to be achieved at time $T_1$, as indicated at 310. Techniques for making these estimated time determinations and performing an action based on the estimated times are discussed additionally below.

Figure 4:
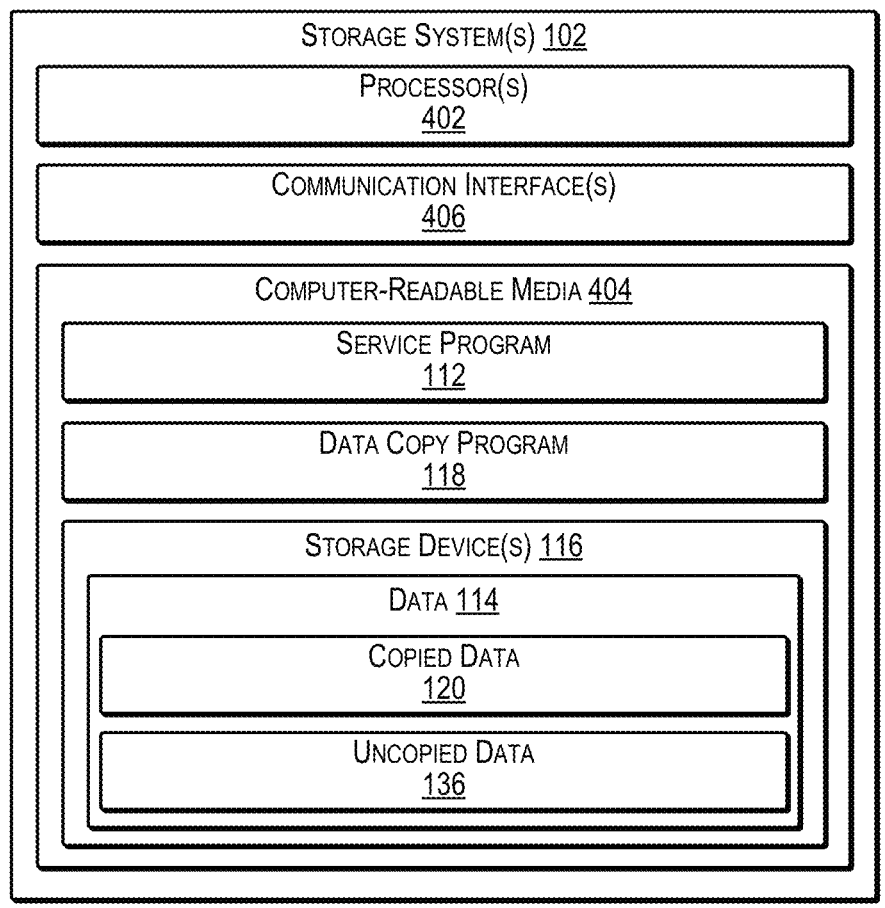
FIG. 4 illustrates an example hardware and logical configuration of a storage system according to some implementations.

FIG. 4 illustrates an example hardware and logical configuration of a storage system 102 according to some implementations. In some examples, the storage system 102 may correspond to any of the storage systems 102(1) and/or 102(2) discussed above, and may include one or more servers that may be embodied in any number of ways. For instance, the programs, other functional components, and at least a portion of data storage of the storage system 102 may be implemented on at least one server, such as in a cluster of servers, a server farm, a data center, a cloud-hosted computing service, and so forth, although other computer architectures may additionally or alternatively be used. In the illustrated example, the storage system 102 includes, or may have associated therewith, one or more processors 402, one or more computer-readable media 404, and one or more communication interfaces 406.

Each processor 402 may be a single processing unit or a number of processing units, and may include single or multiple computing units, or multiple processing cores. The processor(s) 402 may be implemented as one or more central processing units, microprocessors, microcomputers, microcontrollers, digital signal processors, state machines, logic circuitries, and/or any devices that manipulate signals based on operational instructions. As one example, the processor(s) 402 may include one or more hardware processors and/or logic circuits of any suitable type specifically programmed or configured to execute the algorithms and processes described herein. The processor(s) 402 may be configured to fetch and execute computer-readable instructions stored in the computer-readable media 404, which may program the processor(s) 402 to perform the functions described herein.

The computer-readable media 404 may include both memory and storage. For example, the computer-readable media 404 may include volatile and nonvolatile memory and/or removable and non-removable media implemented in any type of technology for storage of information, such as computer-readable instructions, data structures, program modules, or other data. The computer-readable media 404 may include, but is not limited to, RAM, ROM, EEPROM, flash memory or other memory technology. Further, the computer-readable media 404 may include the storage devices 116 which may include any of magnetic disk storage, solid-state storage, optical storage, magnetic tape, storage arrays, network-attached storage, storage area networks, cloud storage, or any other medium that can be used to store the desired information and that can be accessed by a computing device. Depending on the configuration of the storage system 102, the computer-readable media 404 may include a tangible non-transitory media to the extent that, when mentioned, non-transitory computer-readable media exclude media such as energy, carrier signals, electromagnetic waves, and/or signals per se. In some cases, the computer-readable media 404 may be at the same location as the storage system 102, while in other examples, a portion of the computer-readable media 404 may be partially remote from the storage system 102. For instance, in some cases, the computer-readable media 404 may include a portion of storage located over a network from the storage system 102.

The computer-readable media 404 may be used to store any number of functional components that are executable by the processor(s) 402. In many implementations, these functional components comprise instructions or programs that are executable by the processor(s) 402 and that, when executed, specifically program the processor(s) 402 to perform the actions attributed herein to the storage system 102. Functional components stored in the computer-readable media 404 may include the service program 112 and the data copy program 118, each of which may include one or more computer programs, applications, executable code, or portions thereof. For example, the service program 112 may provide communication functionality with the user devices 108, while the data copy program 118 may perform data copy to another storage system 102.

In addition, the computer-readable media 404 may store data, data structures, and other information used for performing the functions and services described herein. For example, the computer-readable media 404 may include the storage devices 116, which store the data 114, and which may include copied data 120 that has already been copied to another storage system 102, such as for disaster recovery protection. The data 114 may further include uncopied data 120, which has not yet been copied to another storage system 102.

The storage system 102 may also include or maintain other functional components and data, which may include programs, drivers, etc., and the data used or generated by the functional components. Further, the storage system 102 may include many other logical, programmatic, and physical components, of which those described above are merely examples that are related to the discussion herein.

The one or more communication interfaces 406 may include one or more software and hardware components for enabling communication with various other devices, such as over the one or more network(s) 106. Thus, the communication interfaces 406 may include, or may couple to, one or more ports that provide connection to the network(s) 106 for communicating with the management computing device(s) 104, the other storage systems 102, and the user devices 108. For example, the communication interface(s) 406 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Figure 5:
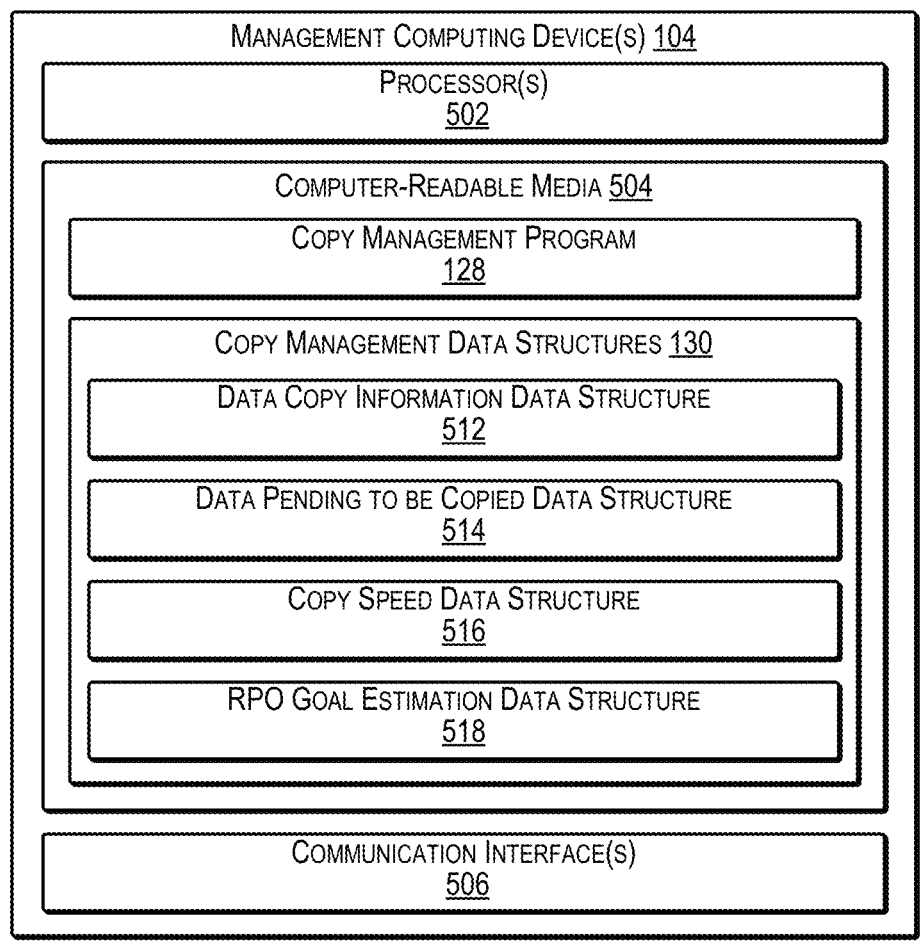
FIG. 5 illustrates an example hardware and logical configuration of the management computing device(s) according to some implementations.

FIG. 5 illustrates an example hardware and logical configuration of the management computing device(s) 104 according to some implementations. In some examples, the management computing device 104 may include one or more servers that may be embodied in any number of ways. For instance, the programs, other functional components, and at least a portion of data storage of the management computing device 104 may be implemented on at least one server, such as in a cluster of servers, a server farm, a data center, a cloud-hosted computing service, and so forth, although other computer architectures may additionally or alternatively be used. For instance, the management computing device 104 may alternatively be a personal computer, such as a desktop, laptop, tablet computing device, smartphone, wearable device, or the like.

The management computing device 104 may include one or more processors 502, one or more computer-readable media 504, and one or more communication interfaces 506. For example, the processors 502 may correspond to any of the examples discussed above with respect to the processors 402, the computer-readable media 504 may correspond to any of the examples discussed above with respect to the computer-readable media 404, and the communication interfaces 506 may correspond to any of the examples discussed above with respect to the communication interfaces 406.

The computer-readable media 504 may be used to store any number of functional components that are executable by the processor(s) 502. In many implementations, these functional components comprise instructions or programs that are executable by the processor(s) 502 and that, when executed, specifically program the processor(s) 502 to perform the actions attributed herein to the management computing device 104. Functional components stored in the computer-readable media 504 may include the copy management program 128, which may include one or more computer programs, applications, executable code, or portions thereof. For example, the copy management program 128 may be configured to perform the functions described herein to cause the management computing device 104 to determine a quantity of pending uncopied data, determine a data copy speed, determine whether the specified RPO goal is being met, estimate a time for meeting the RPO when catching up following an outage, determined additional resources to assign to data copying, and so forth, as discussed above and as discussed additionally below.

In addition, the computer-readable media 504 may store the copy management data structures 130, which may include user data, data object content, data structures, system data and other information used for performing the functions and services described herein. For example, the copy management data structures 130 may include a data copy information data structure 512, a data pending to be copied data structure 514, a copy speed data structure 516, and an RPO goal estimation data structure 518. Each of these copy management data structures 130 is discussed additionally below. Furthermore, while the copy management data structures 130 are illustrated as tables in the examples below, in other examples, other types of data structures may be employed.

The management computing device 104 may also include or maintain other functional components and data, which may include programs, drivers, etc., and the data used or generated by the functional components. Further, the management computing device 104 may include many other logical, programmatic, and physical components, of which those described above are merely examples that are related to the discussion herein.

FIG. 6 illustrates an example data copy information data structure 512 according to some implementations. The data copy information data structure 512 in this example includes a data copy ID 602 that indicates the identifier (ID) assigned to each storage system. The data copy information data structure 512 further includes the sender storage system IDs 604 and the receiver storage system IDs 606 that make up copy pairs. The data copy ID 602 shows an identifier that represents a pair of a sender storage system and a receiver storage system, which are configured to copy data from the identified sender storage system to the identified receiver storage system. The data copy ID 602 can be a numerical value and/or a text value, but is not limited to these and may include any combination of characters. The data copy ID 602 may be automatically generated by the system or may be defined by a user, such as the administrator 129 discussed above.

The sender storage system ID 604 may be an identifier that represents a sender storage system that sends data to a receiver storage system, such as at a different site. The sender storage system ID 604 may be a numerical value and/or a text value, but is not limited to these and may include any combination of characters. The identifier 604 may be automatically generated by the system or may be defined by a user, such as the administrator 129 discussed above.

The receiver storage system ID 606 may be an identifier that represents a receiver storage system that receives data from a sender storage system, such as from a different site. The receiver storage system ID 606 may be a numerical value and/or a text value, but is not limited to these and may include any combination of characters. The receiver storage system ID 606 may be automatically generated by the system or may be defined by a user, such as the administrator 129 discussed above. The identifiers 602, 604, and 606 may be unique in the system 100, 200, such that a sender storage system might not be paired with more than one receiver storage systems and vice versa.

The data copy information data structure 512 may have one or more rows. The rows may be added or deleted in response to a request by a system administrator 129, or the like, to configure data copy in the system. For example, the data copy information data structure 512 of FIG. 5 may correspond to the configuration of the system 200 discussed above with respect to FIG. 2. If a row 608 were to be removed from the data copy information data structure 512, then the remaining row 610 may correspond to the configuration of the system 100 discussed above with respect to FIG. 1.

The copy management program 128 may be executed on the management computing device 104 (or other suitable computing device) to generate the data copy information data structure 512 and may perform any updates to the data copy information data structure 512. Other variations will be apparent to those of skill in the art having the benefit of the disclosure herein.

Figure 7:
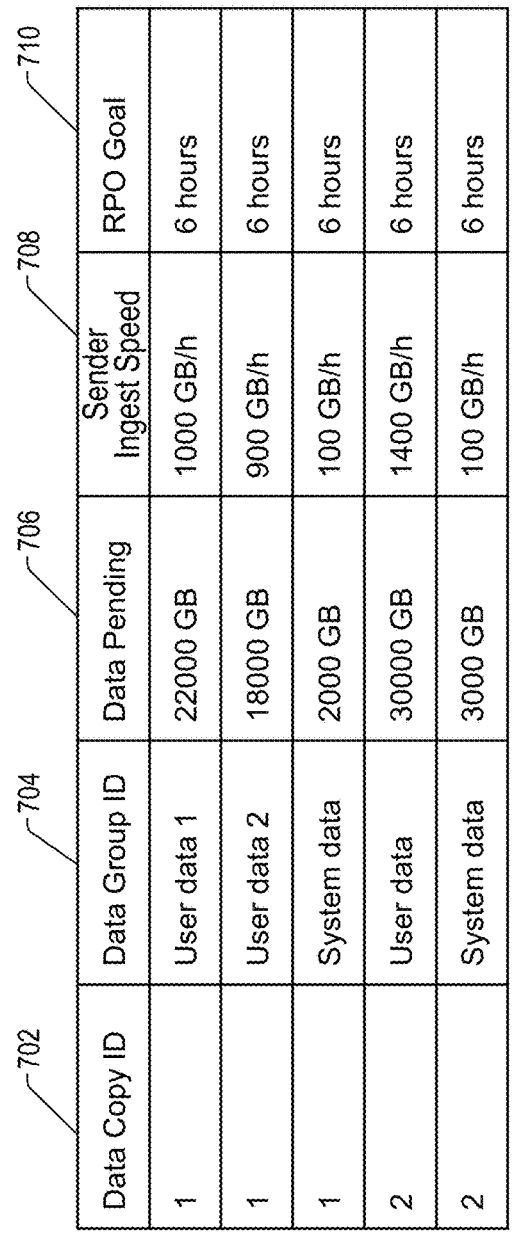
FIG. 7 illustrates an example data pending to be copied data structure according to some implementations.

FIG. 7 illustrates an example data pending to be copied data structure 514 according to some implementations. The data pending to be copied data structure 514 includes data copy ID 702, data group ID 704, data pending 706, sender ingest speed 708, and RPO goal 710. The data copy ID 702 may correspond to the data copy ID 602 discussed above with respect to FIG. 6 and may be an identifier that represents a pair of one sender storage system (e.g., at a first site) and one receiver storage system (e.g., at a second site).

The data group ID 704 may be an identifier that represents a group of data stored in the sender storage system associated with the respective data copy ID 702 in the same row. The data group ID 704 may be a numerical value and a text value or any other combination of characters. The data group ID 704 may be automatically generated by the system or may be defined by a user, such as an administrator.

The data pending 706 may indicate a data size value that represents the amount of data in the corresponding data group 704 that is uncopied, i.e., pending to be copied from the sender storage system to the receiver storage system associated with the respective data copy ID 702. The data size in the data pending column may be in units of bytes and/or may be in other units such as KB, MB, or GB.

The sender ingest speed 708 may indicate an amount of data that the sender storage system has received over time. For example, the sender ingest speed 708 may represent the amount of data in the corresponding data group 704 that has been received during a recent time interval by the sender storage system, such as from one or more user devices or as system data generated by the sender storage system. The time interval to compute the ingest speed may be a short time interval, such as the last 15 minutes, 30 minutes, 45 minutes, etc., or may be a larger time interval such as the last 24 hours. The sender ingest speed 708 may be a value in quantity per unit of time, such as bytes per second, KB/s, MB/s, GB/hr and so forth.

The RPO goal 710 shows a time interval that represents the maximum time that data in the data group corresponding to data group ID 704 is permitted to wait to be copied from the sender storage system to the receiver storage system. For example, if the RPO goal 710 is 6 hours, this means that when there is a failure in the sender storage system, the data ingested at the sender storage system earlier than 6 hours ago should already have been copied to the receiver storage system, and therefore, only the data received over the past 6 hours is lost or otherwise made unavailable due to the failure at the sender storage system. The computing resources for the system may typically be selected to enable the specified RPO goal 710 to be met during normal operating conditions (e.g., steady state conditions). However, in exceptional situations such as following a long outage of the network that connects the sender storage system and the receiver storage system, or any of various other causes that delay copying of data, the system might not be able to meet that RPO goal 710 due to a large backlog of data to be copied from the sender storage system to the receiver storage system. Accordingly, implementations herein provide a solution to this problem to improve the operation of the system overall and to improve the disaster recovery capabilities of the system. The RPO goal 710 may be defined by a user, such as an administrator, or may be set by the system, e.g., based on a default value, extraction from a service-level agreement document, based on an industry standard, a legal requirement, or the like. The RPO goal 710 may typically be a time value, such as seconds, minutes or hours.

FIG. 8 illustrates an example data pending to be copied data structure 514 according to some implementations. In this example, the data pending to be copied data structure 514 of FIG. 7 has been updated by the administer or the management computing device 104 (e.g., by execution of the copy management program 128) to change the RPO goal for the data groups in rows 802, 804 and 806. In this example, the RPO goal for the data group "User data 1" has been changed to 9 hours, as indicated at 802; the RPO goal for "User data 2" has been changed to 7 hours, as indicated at 804; and the RPO goal for "System data" has been changed to 9 hours, as indicated at 806. Accordingly, different types of data may have different RPO goals, which may result in some data being prioritized for copying to the receiver storage system over other data that may have been received sooner at the sender storage system.

Rows may be added to or deleted from the data pending to be copied data structure 514, such as in response to a request by an administrator to configure the data groups in the system. Rows may also be added or deleted by the system automatically, such as based on data relations, the container where data is stored, and/or the tags associated with the data. The copy management program 128 may also update some columns of the data pending to be copied data structure 514, such as data pending 706 and sender ingest speed 708, as additional information about those values is received. For example, the management computing device 104 or other computing device executing the data copy management program 128 may generate and update the information in the data pending to be copied data structure 514 by monitoring the data received at the sender storage system from the user devices 108 and the speed with which the uncopied data is copied to and received by the receiver storage system. The copy management program 128 may be executed on the management computing device 104 to add new rows to the data pending to be copied data structure 514 as additional resources or data groups are added, or similarly, to delete rows as data groups or resources are removed. Other variations will be apparent to those of skill in the art having the benefit of the disclosure herein.

FIG. 9 illustrates an example copy speed data structure 516 according to some implementations. In this example, the copy speed data structure 516 includes a data copy ID 902, a copy speed 904, sender resources 906, sender speed per unit 908, receiver resources 910, and receiver speed per unit 912. The data copy ID 902 corresponds to the identifier (e.g., as discussed above at item 602 of FIG. 6) that represents a pair of one sender storage system and one receiver storage system.

The copy speed 904 indicates a throughput value that represents the amount of data that has been copied in a recent time interval from the sender storage system to the receiver storage system associated with the respective data copy ID 902 in the same row. The time interval used to determine the copy speed may be a short time interval, such as the last 15 minutes, 30 minutes, 45 minutes, etc., or may be a larger time interval such as the last 24 hours, and so forth. The throughput in copy speed 904 may be a value expressed in quantity per unit of time, such as bytes per second, KB/s, MB/s, GB/hr and so forth.

The sender resources 906 may be a numerical value that represents the amount of resources in the sender storage system that are assigned to copy data to the receiver storage system. The numerical value in the sender resources 906 may be expressed in units, which can represent a number of servers, containers, virtual machines, or other computing resources. As one example, the units used to represent the sender resources 906 may indicate a set of resources such as a number of CPUs and an amount of memory but implementations herein are not limited to these computing resources.

The sender speed per unit 908 may indicate a throughput value that represents the amount of data copied during a time interval by one unit of resources of the sender storage system. The throughput expressed in the sender speed per unit 908 may be a numerical value expressed as bytes per unit of time, such as KB/s, MB/s, GB/hr, and so forth. Furthermore, the sender speed per unit 908 may be different for different sender storage systems.

The receiver resources 910 may be a numerical value that represents the amount of resources in the receiver storage system that are assigned to receive data from the sender storage system. The numerical value in the receiver resources 910 may be expressed in units, which can represent a number of servers, containers, virtual machines, or other computing resources. As one example, the units used to represent the receiver resources 910 may indicate a set of resources such as a number of CPUs and an amount of memory but implementations herein are not limited to these computing resources.

The receiver speed per unit 912 indicates a throughput value that represents the amount of copied data received during a time interval by one unit of resources of the receiver storage system. The throughput expressed in the receiver speed per unit 912 may be a numerical value expressed as bytes per unit of time, such as KB/s, MB/s, GB/hr, and so forth. Furthermore, the receiver speed per unit 912 may be different for different receiver storage systems.

The copy speed data structure 516 may include one row for each row included in the data copy information data structure 512. In addition, the copy speed data structure 516 may be maintained and updated by the data management program 128 executing on the management computing device 104 or other suitable computing device.

FIG. 10 illustrates an example RPO goal estimation data structure 518 according to some implementations. The RPO goal estimation data structure 518 in this example includes a data copy ID 1002, sender resources 1004, receiver resources 1006, copy speed 1008, pending data to shrink speed 1010, RPO margin 1012, data to copy 1014, and time to reach RPO goal 1016. The data copy ID 1002 corresponds to the identifier (e.g., as discussed above at item 602 of FIG. 6) that represents a pair of one sender storage system and one receiver storage system.

The sender resources 1004 may be a numerical value that represents the amount of resources in the sender storage system that the user (e.g., the administrator 129) or the computing device executing the copy management program 128 has selected to assign to send data to the receiver storage system. The numerical value in the sender resources 1004 may be expressed in units, which can represent a number of servers, containers, virtual machines, or other computing resources. As one example, the units used to represent the sender resources 1004 may indicate a set of resources such as a number of CPUs and an amount of memory but implementations herein are not limited to these computing resources. In some examples, the sender resources value 1004 may be obtained from an input field for sender resources in an RPO goal estimation graphical user interface discussed additionally below with respect to FIGS. 12-13. In other examples, the copy management program 128 may select the value so as to indicate the corresponding times to reach RPO goal 1016 for various different amounts of sender resources 1004.

The receiver resources 1006 may be a numerical value that represents the amount of resources in the receiver storage system that the user (e.g., the administrator 129) or the computing device executing the copy management program 128 has selected to assign to the receiver storage system for receiving data from the sender storage system. The numerical value in the receiver resources 1006 may be expressed in units, which can represent a number of servers, containers, virtual machines, or other computing resources. As one example, the units used to represent the receiver resources 1006 may indicate a set of resources such as a number of CPUs and an amount of memory but implementations herein are not limited to these computing resources. In some examples, the receiver resources value 1006 may be obtained from an input field for sender resources in an RPO goal estimation graphical user interface discussed additionally below with respect to FIGS. 12-13. In other examples, the copy management program 128 may select the value for the receiver resources 1006 so as to indicate the corresponding times to reach RPO goal 1016 for various different amounts of receiver resources 1006.

The copy speed 1008 may indicate a throughput value that represents the amount of data that is predicted to be copied in a time interval from the sender storage system to the receiver storage system for the sender-receiver pair corresponding to the data copy ID at 1002. The copy speed 1008 may be a value expressed in quantity per unit of time, such as bytes per second, KB/s, MB/s, GB/hr and so forth.

The pending data shrink speed 1010 may indicate a throughput value that represents a decrease during a time interval of the size of the uncopied data pending to be copied. The pending data shrink speed 1010 may be a value expressed as bytes per unit of time such as KB/s, MB/s, and GB/hr.

The RPO margin 1012 may indicate a data size value that represents the amount of data that can be ingested during the time set as a specified RPO goal for the data. For example, the RPO margin may be a data size value expressed in bytes, such as KB, MB, or GB.

The data to copy 1014 may indicate a data size value that represents the amount of uncopied data that is scheduled to be copied to fulfill the RPO goal set for the data. The data to copy 1014 may be a value in bytes, such as KB, MB, or GB.

The time to reach RPO goal(s) 1016 may indicate a time interval that represents an estimated time for the selected sender resources 1004 and receiver resources 1006 to reach the RPO goal for the uncopied data referenced in the data to copy 1014. In some examples, the specified resources 1004, 1006 may be values entered by an administrator via the graphical user interface discussed below with respect to FIGS. 12-13. In other examples, the specified sender and receiver resources 1004, 1006, respectively, may be selected by the copy management program 128 executing on a computing device. For example, if the time to reach RPO Goal(s) 1016 is 60 hours, as indicated at 1016, and the RPO goals are all set to 6 hours, this means that after 60 hours, all data ingested at the sender storage system more than 6 hours prior should be already copied to the receiver storage system. The time to reach RPO goal(s) 1016 may be a time value, such as seconds, minutes, hours, etc.

In some examples, as illustrated, the RPO goal estimation data structure may include only one row. In other examples, such as in the case in which different data groups have different RPO goals, there may be several different rows for the different RPO goals for the different data groups. The RPO goal estimation data structure 518 may be maintained and updated by the management computing device 104, or other computing device, executing the copy management program 128.

FIG. 11 illustrates an example RPO goal estimation data structure 518 according to some implementations. In this example, the RPO goal estimation data structure 518 has been updated to show an updated time to reach the RPO goal 1016 based on updating the sender resources 1004 and the receiver resources 1006. As discussed additionally below, the system may determine a plurality of different times to reach RPO goals 1016 for a plurality of different numbers of sender resources 1004 and/or receiver resources 1006. Based on the determined times to reach RPO goals 1016, the management computing device may select one or more configurations of resources to use for achieving an RPO goal such as based on an optimal number of resources being committed to the copying task.

Figure 12:
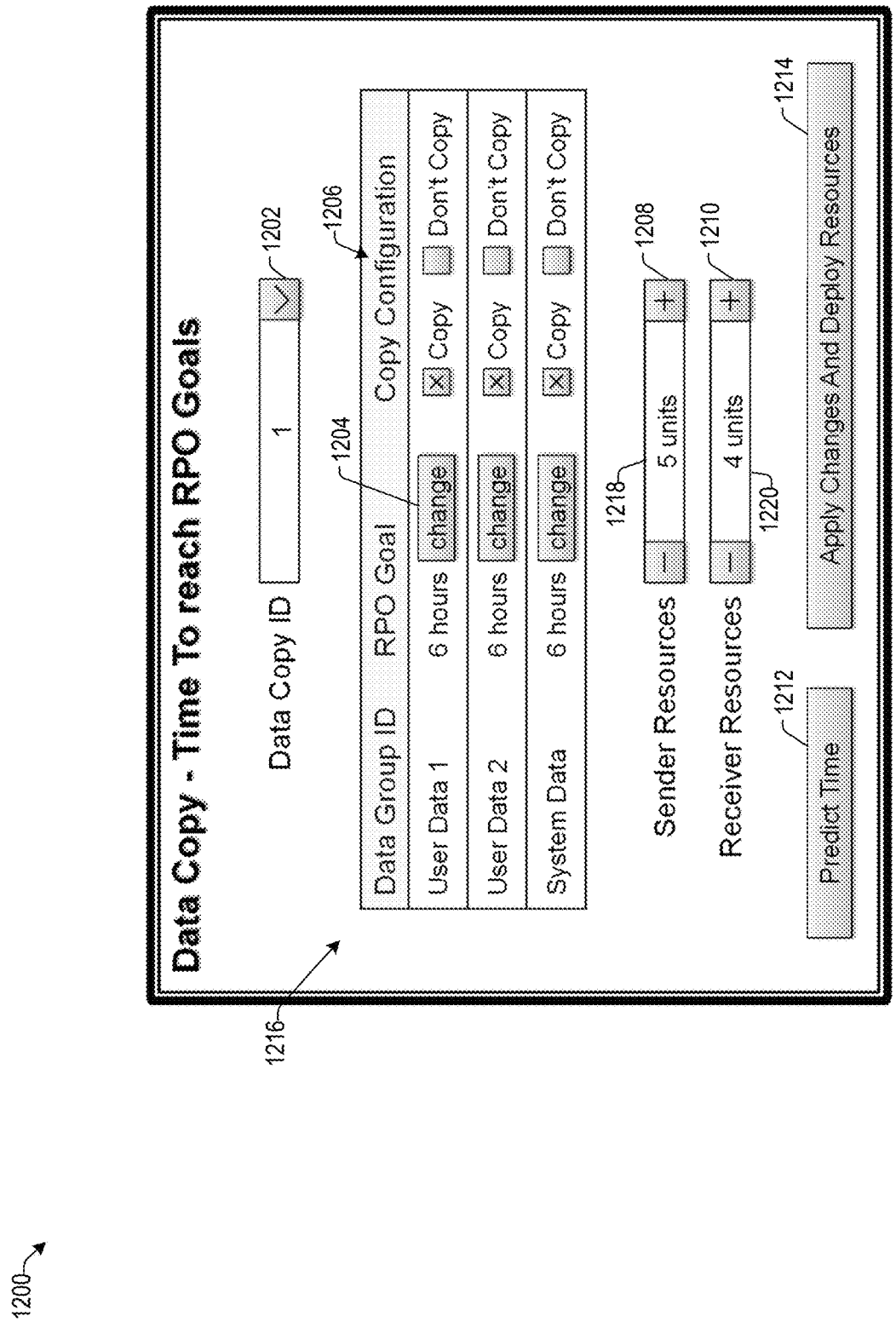
FIG. 12 illustrates an example RPO goal estimation graphical user interface (GUI) that may be used for determining times to reach RPO goals according to some implementations.

FIG. 12 illustrates an example RPO goal estimation graphical user interface (GUI) 1200 that may be used for determining times to reach RPO goals according to some implementations. In some examples, the GUI 1200 may be generated by the management computing device 104 or other suitable computing device, such as by execution of the copy management program 128. For instance, the RPO goal estimation GUI 1200 may be presented on a display for viewing by the administrator 129 or other user. The example of FIG. 12 may correspond to the example RPO goal estimation data structure 518 illustrated in FIG. 10.

The may include a plurality of user-interactive virtual controls such as a data copy ID selection control 1202, an RPO goal change control 1204, copy configuration controls 1206, a sender resources selection control 1208, a receiver resources selection control 1210, a selectable control 1212 for determining a predicted time for achieving specified RPO goals, and a selectable control 1214 that is selectable for applying changes and deploying the specified sender and/or receiver resources for achieving an RPO goal in an estimated amount of time.

The data copy ID selection control 1202 may enable a user to select a data copy identifier, such as may correspond to one of the data copy IDs 602 in the data copy information data structure 512 discussed above with respect to FIG. 6. For instance, in the example of FIG. 6, the user may select either data copy ID number "1" or number "2".

A data table 1216 in the GUI 1200 may include a respective row for each different data group to be copied in association with the selected data copy ID 1202. The data table 1216 may be refreshed when a user changes the data copy ID 1202. Each row in the data table 1216 may include the data group ID and the RPO goal currently associated with each data group, as well as copy configuration controls 1206 for selecting whether to copy or not copy the data of the corresponding data group to the receiver storage system. The RPO goal change controls 1204 enable the user to change the shown RPO goal for each individual data group.

The sender resources selection control 1208 allows a user to change a numeric value in a field 1218 representing the number of resource units that are assigned to the sender storage system associated with the data copy ID indicated at 1202. When the RPO goal estimation GUI 1200 is presented to a user, the field 1218 corresponding to the sender resources selection control 1208 may already be populated with a value, such as may have been selected by the data management program 128. For example, the existing resources, a default value, or a value representing some or all the available resources that can be added to the sender storage system for performing data copy operations may be indicated in the field 1218.

The receiver resources selection control 1210 allows a user to change a numeric value in a field 1220 representing the number of resource units that are assigned to the receiver storage system associated with the data copy ID indicated at 1202. When the RPO goal estimation GUI 1200 is presented to a user, the field 1220 corresponding to the receiver resources selection control 1210 may already be populated with a value, such as may have been selected by the data management program 128. For example, the existing resources, a default value, or a value representing some or all the available resources that can be added to the sender storage system for performing data copy operations may be indicated in the field 1220.

The action button Predict Time 2405 allows users to trigger the RPO Goal estimation program 2360 and receive a time prediction, which can be shown as a popup or displayed in the same interface.

The selectable control 1212 for determining a predicted time for achieving specified RPO goals may be selected to view the estimated time for achieving the RPO goal(s) with the presented configuration. In some cases, the selectable control 1212 may be enabled after an estimated time for achieving the RPO goal for an existing configuration has been presented to the user.

The selectable control 1214 that is selectable for applying changes and deploying the specified sender and/or receiver resources allows users to apply the changes made in the data table 1216 and instruct the sender storage system associated with the data copy ID 1202 to deploy resources to fulfill the number of resources entered in the input field sender resources 2403, and instruct Receiver storage system 4000 associated with the Data Copy ID 2401 to deploy resources to fulfill the number of resources entered in the input field Receiver Resources 2404.

The selectable control 1214 that is selectable for applying changes and deploying the specified sender and/or receiver resources may typically be selected after the user has made any changes to the data copy configuration shown in the GUI 1200. In some cases, the copy management program may present the GUI 1200 to the user with the optimal configuration already presented in the GUI 1200, thus enabling the user to select the selectable control 1214 without having to make any other changes to the GUI 1200.

RPO goal estimation GUI 1200 may be used by administrators or other users when there is risk of not meeting the RPO goals and/or when the RPO goals are unfulfilled. The RPO goal estimation GUI 1200 may provide guidance to the user to provide the user with an understanding of the time that is estimated to be needed to reach the given RPO goals with the resources currently assigned and/or with the recommended resources. Accordingly, the RPO goal estimation GUI 1200 may enable the user to understand the number of additional resources that may be specified in the GUI 1200 for meeting the given RPO goals for the data groups associated with the data copy ID selected at 1202.

Figure 13:
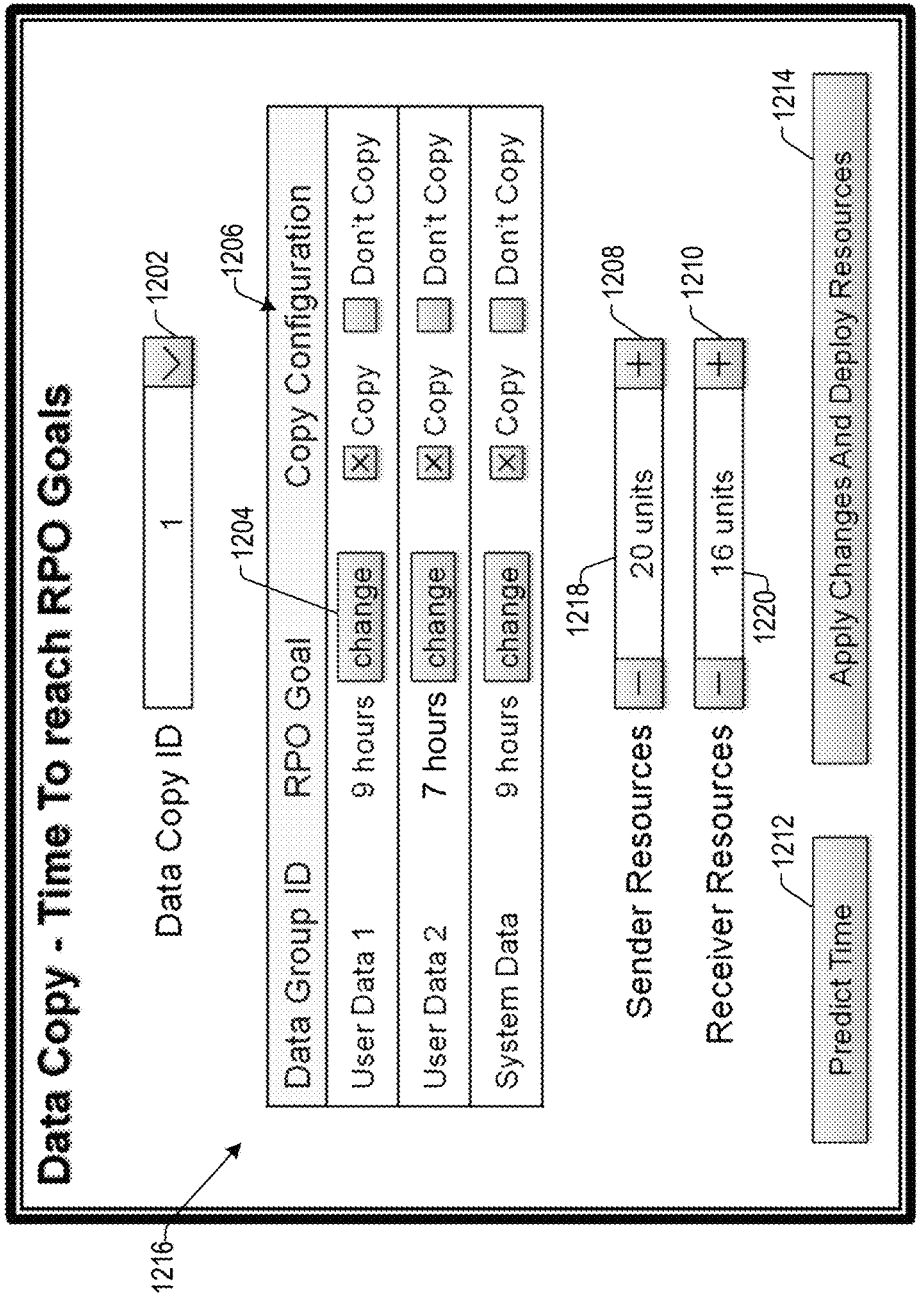
FIG. 13 illustrates an example RPO goal estimation GUI indicating time to reach RPO goals according to some implementations.

FIG. 13 illustrates an example RPO goal estimation graphical user interface (GUI) 1200 indicating time to reach RPO goals according to some implementations. The example of FIG. 13 may correspond to the example RPO goal estimation data structure 518 illustrated in FIG. 11. For instance, in this example, the sender resources indicated at 1218 and the receiver resources indicated at 1220 have been increased to a larger number of resource units for both the sender resources and the receiver resources. In addition, suppose that the user has changed the RPO goals for the User Data 1 and System Data to 9 hours and for the User Data 2 to 7 hours. Accordingly, the RPO goals in this case may be met within 3 hours, as indicated at 1016 of FIG. 11, and which value may be presented to the user should the user select the selectable control 1212 for determining a predicted time.

In addition, while the foregoing description of the GUI 1200 enables user interaction with various settings enabled in the GUI 1200, in other examples, the GUI may merely present information to the user to present to the user how the data copy resources have been automatically reconfigured by execution of the copy management program 128 to reconfigure the system to meet the RPO goal at an optimal time that takes into consideration the available additional resources and the amount of data backlog that may have been created while the sender storage system was unable to copy data to the receiver storage system. Accordingly, in some examples, the management computing device 104, or other suitable computing device executing the copy management program 128 may automatically react to assign additional resources to the sender storage system and/or the receiver storage system when RPO goals are unfulfilled.

Figure 14:
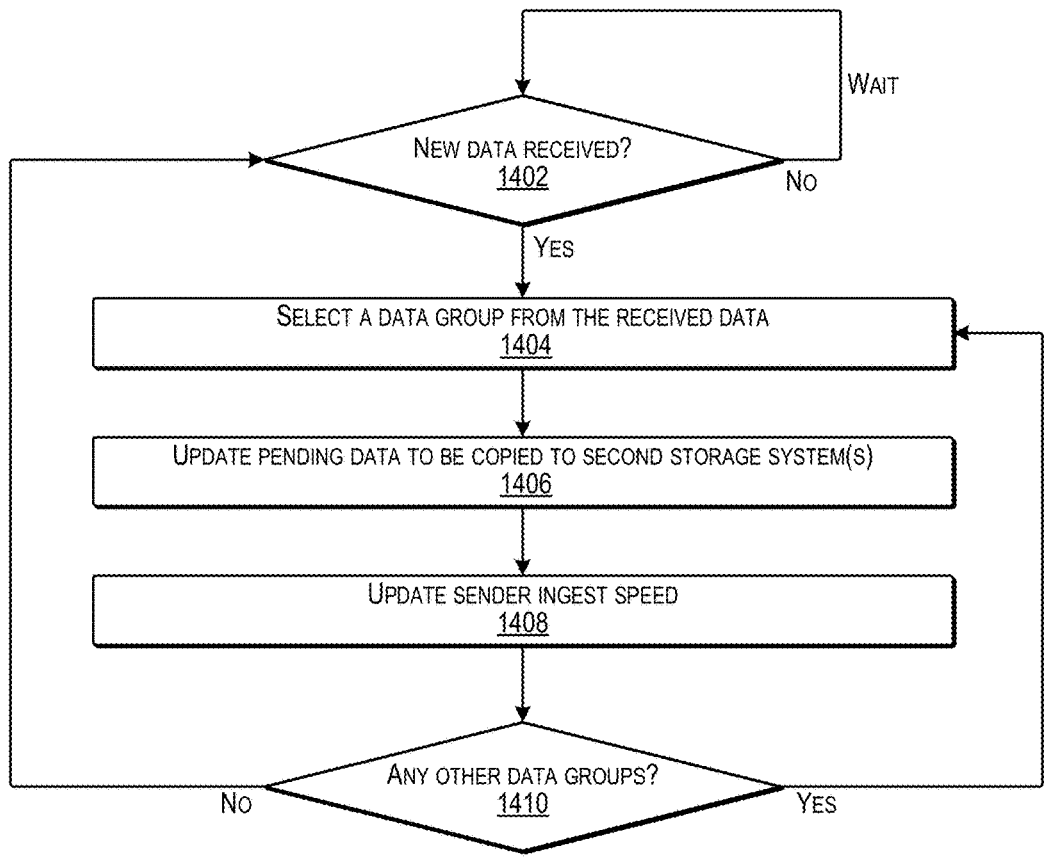
FIG. 14 is a flow diagram illustrating an example process for updating the data pending to be copied according to some implementations.
Figure 15:
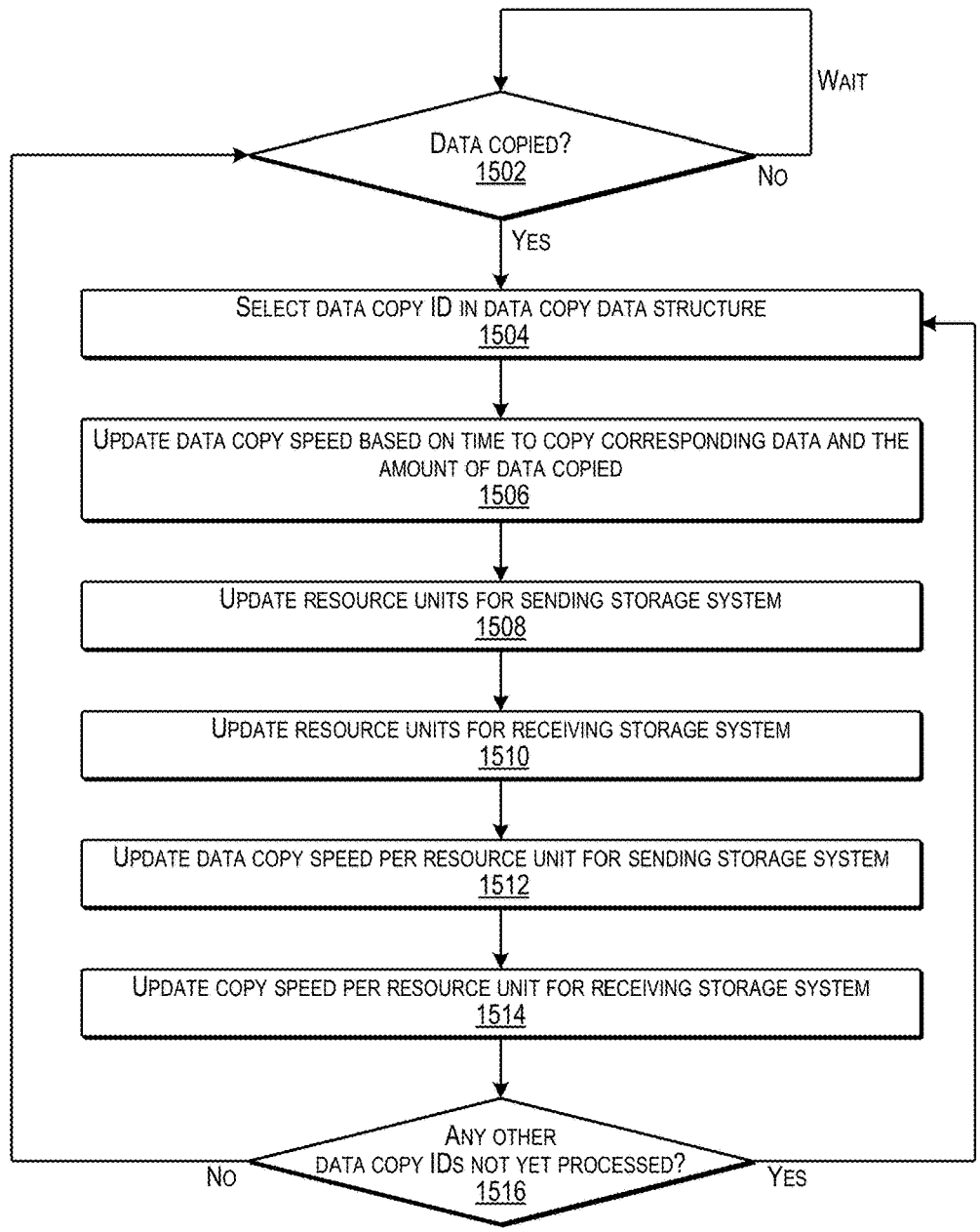
FIG. 15 is a flow diagram illustrating an example process for updating the copy speed data structure according to some implementations.
Figure 16:
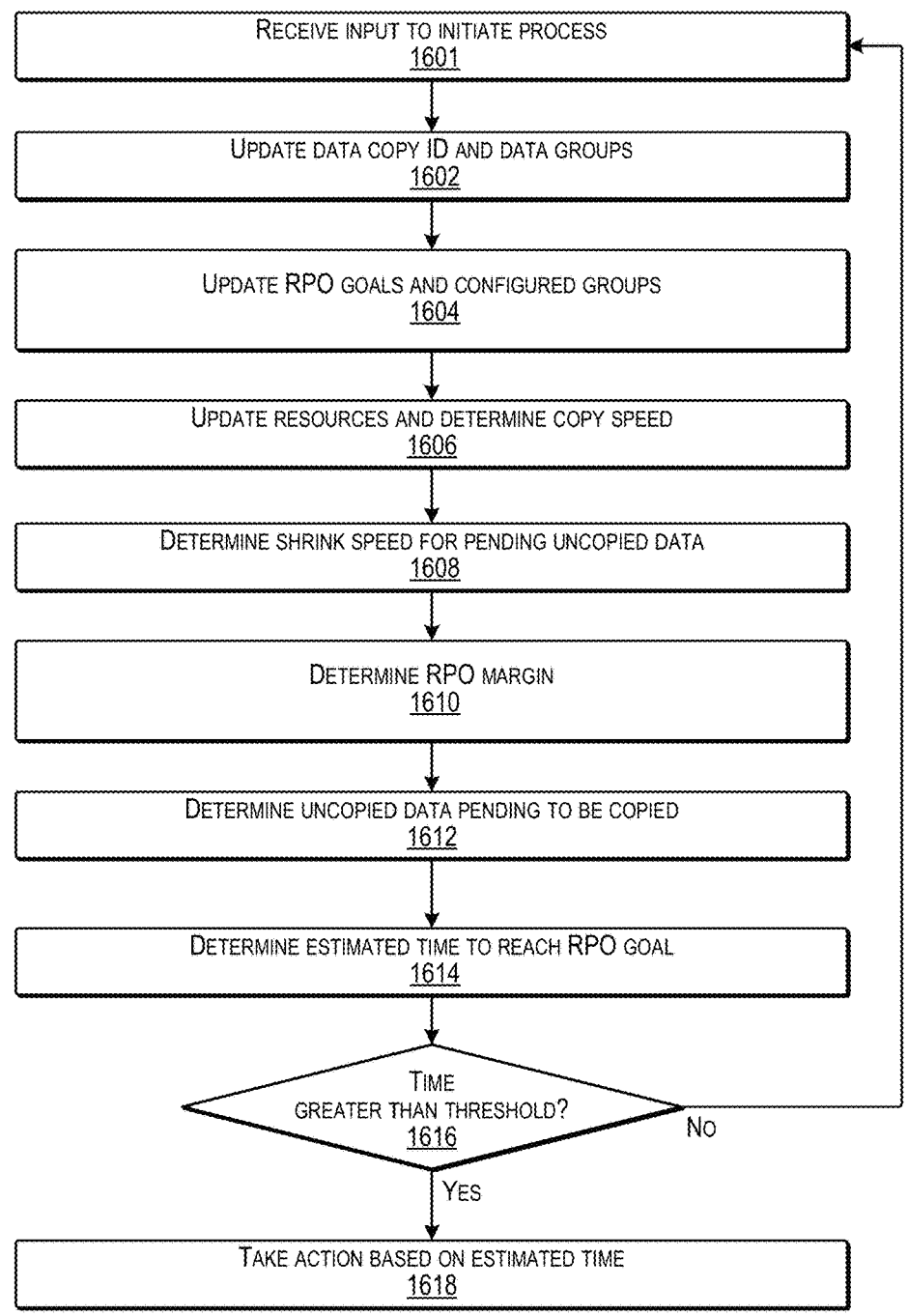
FIG. 16 is a flow diagram illustrating an example process for determining an estimated time to reach an RPO goal according to some implementations.

FIGS. 14-16 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 14 is a flow diagram illustrating an example process 1400 for updating the data pending to be copied according to some implementations. For example, the management computing device 104, or other suitable computing device, may execute the copy management program 128 to perform at least a portion of the process 1400.

At 1402, the computing device may check whether new data has been received at the sender storage system. If so, the process goes to 1404. If not, the process may wait, and may then perform the check again. As one example, the process 1400 may be configured to check for new data periodically, e.g., every minute, every five minutes, every ten minutes, etc. Alternatively, the process 1400 may be triggered after data is ingested by the sender storage system and/or after data is copied from the sender storage system to its corresponding receiver storage system.

At 1404, the computing device may select a data group for processing. For example, the process may iterate through each data group listed in the data pending to be copied data structure 514 of FIG. 7 for the data copy ID of the sender storage system. In other words, the process 1400 iterates through each row in the data structure 514 of FIG. 7 having a data copy ID corresponding to the selected sender storage system.

At 1406, the computing device may update the amount of pending data to be copied to the receiver storage system. For instance, the computing device may determine the amount of data received for each data group ID 704 of FIG. 7 that has not yet been copied to the receiver storage system. The determined amount of data may be added to the column for data pending 706 of the data structure 514 in the row for the selected data group ID 704 currently being processed.

At 1408, the computing device may update the sender ingest speed for the sender storage system. For example, the computing device may determine the amount of data in for the selected data group ID 704 that has been written during a recent period of time, e.g. in the last 5 minutes, 15 minutes, hour, etc., and determines the ingest speed. For example, if 60 GB of data has been ingested in the last hour, the ingested speed is 60 GB/hr. The computing device may update the value for the sender ingest speed 708 in the data pending to be copied data structure 514 in the row for the selected data group ID currently being processed.

At 1410, the computing device may determine whether there are any other data groups that have not yet been processed. If so, the process returns to 1404 to select the next data group for processing. If not, the process goes to 1402 to check whether any new data has been received.

FIG. 15 is a flow diagram illustrating an example process 1500 for updating the copy speed data structure according to some implementations. For example, the management computing device 104, or other suitable computing device, may execute the copy management program 128 to perform at least a portion of the process 1500.

At 1502, the computing device may determine whether any data has been copied from the sender storage system to the receiver storage system. If so, the process goes to 1504. If not, the process may wait and then check again. As one example, the process 1500 may be configured to check periodically, e.g., every minute, every five minutes, every ten minutes, etc. Alternatively, the process 1500 may be triggered by the sender storage system and/or after the resources assigned for data copy change in the sender storage system and/or in the receiver storage system.

At 1504, the computing device may select a row in the copy speed data structure 516 for processing. For example, the process 1500 may iterate through each data copy ID 902 in the copy speed data structure 516, i.e., through each row in the data structure 516.

At 1506, the computing device may update the copy speed 904 in the copy speed data structure 516. For example, the computing device determines the sender storage system and receiver storage system corresponding to the current data copy ID 902 being iterated by referring to columns 602, 604, and 606 in the data copy information data structure 512. The computing device may determine the amount of data that has been copied from the sender storage system to the receiver storage system during a recent period of time, e.g. in the last 5 minutes, 10 minutes, half hour, hour, etc., and computes the copy speed. For example, if 100 GB of data has been copied in the last hour, the copy speed is 100 GB/hr. The computing device may update column 904 of the copy speed data structure 515 with the determined copy speed in the row for the data copy ID 902 currently being iterated.

At 1508, the computing device may update the resource units for the sending storage system. For example, the computing device may determine the amount of resource units associated with the sender storage system that are assigned to send data to the receiver storage system. The computing device may update the quantity of resource units in the sender resources 906 column in the row for the data copy ID 902 currently being processed.

At 1510, the computing device may update the resource units for the receiver storage system. For example, the computing device may determine the amount of resource units associated with the receiver storage system that are assigned to receive data from the sender storage system. The computing device may update the quantity of resource units in the receiver resources 910 column in the row for the data copy ID 902 currently being processed.

At 1512, the computing device may update the sender speed per unit 908 in the copy speed data structure 516. For example, the computing device may divide the value in column 904 by the value in column 906 at the corresponding row. The computing device may write the resulting value to column 908 of data structure 516 in the corresponding row for the data copy ID 902 currently being iterated.

At 1514, the computing device may update the receiver speed per unit 912 in the copy speed data structure 516. For example, the computing device may divide the value in column 908 by the value in column 910 at the corresponding row. The computing device may write the resulting value to column 912 of data structure 516 in the corresponding row for the data copy ID 902 currently being iterated.

At 1516, the computing device may determine whether there are any other data copy IDs in the data copy data structure 516 that have not yet been processed. If so, the process returns to 1504 to select the next data copy ID for processing. If not, the process goes to 1502 to check whether any data has been copied.

FIG. 16 is a flow diagram illustrating an example process 1600 for determining an estimated time to reach an RPO goal according to some implementations. For example, the management computing device 104, or other suitable computing device, may execute the copy management program 128 to perform at least a portion of the process 1600.

At 1601, the computing device may initiate the process 1600 based on an input from the user. For example, the process 1600 may be initiated when a user interacts with the GUI 1200 discussed above with respect to FIGS. 12 and 13. As one example, by changing the value of the input field 1202, or selecting a virtual control in the data table 1216, or by selecting another selectable virtual control, 1208, 1210, 1212, 1214, the user may cause the process 1600 to initiate. Alternatively, the system may interact with the virtual controls of the GUI to start the process 1600, such as in response to receiving an alert for an unfulfilled RPO goal or an indication of a risk of an unfulfilled RPO goal. For example, the process 2016 may be executed for estimating an amount of resources needed to satisfy a threshold time for reaching an RPO goal. In some cases, the computing device may automatically select and deploy the needed resources for reaching the RPO goal, such as with an optimal usage of available resources.

At 1602, the computing device may update the data copy ID and data groups such as based on receiving an input. For example, when the GUI 1200 loads and when a user changes an input field for the data copy ID at 1202, the computing device may retrieve the value entered in the input field of the data copy ID 1202 in the GUI 1200, and may write this value in the column for the data copy ID 1002 in the RPO goal estimation data structure 518. In addition, the computing device may match the data copy ID 1202 with the data copy ID 1002, and may write in the data table 1216 in the GUI 1200 at the data group ID the RPO goal 710 from the data pending data structure 514 that is associated with the data copy ID 1202. The computing device may further enable the "Copy" checkbox and disable the "Don't Copy" checkbox in the Data Table for all the Data Group IDs shown in the GUI 1200. For example, the values in the GUI 1200 in FIG. 10 correspond to the values in the RPO goal estimation data structure 518 of FIG. 10 in this example.

At 1604, the computing device may update one or more RPO goals and/or configured groups. For instance, when the user changes an RPO goal value or changes the copy configuration for a data group shown in the data table 1216, such as by selecting a virtual control for changing the RPO goal or checking/unchecking one of the checkboxes "Copy" and "Don't Copy" the computing device may update the value for the RPO goal 710 in the data pending data structure 514 in the row that matches the corresponding data group ID 704 and that selected in the GUI 1200. Similarly, when a user sets the Copy Configuration for a data group shown in the data table 1216 to "Don't Copy", the computing device may remove the corresponding row from the data pending data structure 514. Additionally, when a user sets the Copy Configuration for a data group to "Copy", the computing device may add a row in the data pending data structure 514 that matches the data group ID in the GUI 1200. These changes to the data pending data structure 514 enable estimation of a hypothetical scenario and, in some examples, are not applied to the system unless the user selects the virtual control 1214 to apply the changes and deploy the resources. When the GUI 1200 is closed, the changes in the data pending data structure 514 may be discarded unless the user selects the virtual control 1214 to apply the changes.

At 1606, the computing device may update resources and determine a copy speed. For example, when the GUI 1200 is presented and a user changes the value in the field 1218 for sender resources and/or the input field 1220 for receiver resources, the computing device may retrieve the value in the field 1218 for sender resources and write this value in the sender resources 1004 in the RPO goal estimation data structure 518. Additionally, the computing device may update the value in the field 1220 for receiver resources and may write the value in the receiver resources 1006 in the RPO goal prediction data structure 518. Further, the computing device may determine the sender speed per unit 902 and the receiver speed per unit 912 in the copy speed data structure 516 in the corresponding row. In addition, the computing device may determine the potential sender speed by multiplying the value in sender resources 906 and the value in the sender speed per unit 908. In addition, the computing device may determine the potential receiver speed by multiplying the value in receiver resources 910 and the value in the receiver speed per unit 912. Additionally, the computing device may compare potential sender speed and potential receiver speed and may write the lower value in the copy speed 904 in the RPO goal prediction data structure 518. For example, in the data structure 518 of FIG. 10, the result is 2500 GB/h, because 2500 GB/h is the lower value of the potential sender speed 2500 GB/h (5 multiplied by 500) and the potential receiver speed 2500 GB/h (4 multiplied by 625), based on the values in the copy speed data structure 516 of FIG. 9. For example, in FIG. 9, the result is 10000 GB/h, because 10000 GB/h is the lower value of the potential sender speed 10000 GB/h (20 multiplied by 500) and the potential receiver speed 10000 GB/h (16 multiplied by 625), based on the values in FIG. 9. In both examples, the values potential sender speed and potential receiver speed are the same, but they may be different in other examples.

At 1608, the computing device may determine a shrink speed for any pending uncopied data. For example, the computing device may determine the value of the sender ingest speed 708 in the data pending data structure 514 in the row(s) that match the data copy ID 702 with the data copy ID 1202. Further, the computing device may determine the total ingest speed by adding together all the sender ingest speeds 708. In addition, the computing device may determine the difference between the copy speed 1008 in the RPO goal prediction data structure 518 and the computed total ingest speed. The computing device may write the result in the pending data shrink speed column 1010 in the RPO goal prediction data structure 518. In the example of FIG. 10, the result is 500 GB/h (i.e., 2500−2000), because total ingest speed is 2000 GB/h (1000+900+100), based on the values in FIG. 8. For example, in FIG. 11, the result is 8000 GB/h (10000−2000), because total ingest speed is 2000 GB/h (1000+900+100), based on the values in FIG. 8.

At 1610, the computing device may determine the RPO margin. For example, the computing device may determine values of sender ingest speed 708 and RPO goal 710 in the data pending data structure 514 in the rows corresponding to the data copy ID 702 and the data copy ID 1202. The computing device may further determine a set of margin values by multiplying the sender ingest speed 708 and RPO goal 710 for each row found in the data pending data structure 514. In addition, the computing device may add all values in the set of margin values and may write the result in the RPO Margin 1012 in the RPO goal prediction data structure 518. For example, in FIG. 10, the result is 12000 GB (1000×6+900×6+100×6), based on the values in FIG. 7. For example, in FIG. 11 the result is 16200 GB (1000×9+ 900×7+100×9), based on the values in FIG. 8.

At 1612, the computing device may determine any uncopied pending data that needs to be copied to a receiver computing device. For example, the computing device may determine the values of data pending 706 in the data pending data structure 514 in the rows that match the data copy ID 702 with the data copy ID 1202. In addition, the computing device may determine the total data pending by adding all the data pending 706 values found, and may determine the difference between the computed total data pending and the RPO margin 1012 in the RPO goal estimation data structure 518. The computing device may write the result in the data to copy 1014 column in the RPO goal prediction data structure 518. For example, in FIG. 10, the data to copy result is 30000 GB (42000−12000), because total data pending is 42000 GB (22000+18000+2000), based on the values in FIG. 8. Additionally, in FIG. 11, the result is 25800 GB (42000−16200), because total data pending is 42000 GB (22000+18000+2000), based on the values in FIG. 9.

At 1614, the computing device may determine an estimated time to reach an RPO goal. For example, the estimated time to reach the RPO goal may be determined when the user selects the virtual control to predict time 1212 in the GUI 1200. The computing device may divide the data to copy 1014 by the pending data shrink speed 1010 in the RPO goal estimation data structure 518, and may write the result in the time to each RPO goals 1016. In the example of FIG. 7 the result is 60 hours (30000 divided by 500). In the example of FIG. 8, the result is 3.2 hours (25800 divided by 8000). The computing device may present the estimated time to reach the RPO goal(s) 1016 in the GUI 1200, such as in a popup window or through any other type of interface.

Additionally, in some examples, the computing device may perform a bandwidth test to determine the bandwidth of the network between the sender storage system and the receiver storage system, which may indicate a throughput limit between the sender storage system and the receiver storage system. For example, if the network connection between the sender and receiver is relatively slow (i.e., relatively low bandwidth and/or low throughput), then deploying a substantial amount of additional computing resources for performing the data copy operations may not be an optimal utilization of computing resources because the network might cause a bottleneck and the additional computing resources may therefore be wasted. Furthermore, in the case that the bandwidth of the network is limited and the user manually deploys additional resources anyway, the computing device may alert the user that the detected network bandwidth is below a value at which additional resources selected by the user may be helpful for increasing the data copy throughput. For instance, the value for copy speed 1008 in the RPO goal prediction data structure 518 may exceed the throughput of the network if the network has limited bandwidth.

As another example, the computing device may query a database or the network device itself to determine the throughput between the sender storage system and the receiver storage system. For instance, this technique may be performed in a manner similar to determining the CPU speed of a personal computer. The computing device may perform a performance test or may check the system properties to determine the performance value. As mentioned above, when the performance is limited, this performance limit may be used to determine an optimal amount of additional resources to designate for the data copy operations.

At 1616, the computing device may determine whether the estimated time to reach the RPO goal is within a threshold. If so, the process goes to 1601. If not, the process goes to 1618. For example, if the time to reach the RPO goal is shorter than a threshold time, such as a time previously set by the administrator, then the computing device does not perform any additional actions, and the process may return to 1601 to wait to be initiated again.

At 1618, on the other hand, when the estimated time to reach the RPO goal is greater than the threshold, the computing device may take an action based on the estimated time. For example, the computing device may determine additional resources to assign to the copy operation for the sender storage system and/or the receiver storage system to reduce the estimated time below the threshold. In some cases, such as when a large number of computing resources would be appropriate to catch up on the copy operations, the computing device may be configured to acquire network computing resources, such as cloud computing resources available commercially on a temporary basis such as from a data center, server farm, etc. As another example, the computing device may be configured to repurpose computer resources temporarily from other tasks that are less urgent and then, when the specified RPO goal is reached, release the additional resources to resume their original tasks. Numerous other variations will be apparent to those of skill in the art having the benefit of the disclosure herein.

In some examples, the computing device (e.g., the management computing device 104 executing the copy management program 128) may apply the additional resources automatically, while in other examples, the computing device may present the additional resources to the user with the indication that the estimated time is below the threshold, and may wait for the user to approve the additional resources by selecting the virtual control 1214 to "Apply Changes and Deploy Resources". For example, based on receiving the user input via the GUI 1200, the computing device may send one or more instructions to the sender storage system to deploy the additional resources at the sender storage system, and may send one or more instructions to the receiver storage system to deploy the additional resources at the receiver storage system. Additionally, in some examples, one or more storage system computing devices may execute the copy management program 128 to perform the functions discussed above instead of, or in addition to, the management computing device 104. Further while several example actions are discussed above, numerous variations will be apparent to those of skill in the art having the benefit of the disclosure herein.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art. Additionally, while several example systems have been described, numerous other systems able to implement the storage and capacity-usage-balancing techniques herein will be apparent to those of skill in the art having the benefit of the disclosure herein.

Various instructions, processes, and techniques described herein may be considered in the general context of computer-executable instructions, such as programs stored on computer-readable media, and executed by the processor(s) herein. Generally, programs include routines, modules, applications, objects, components, data structures, executable code, etc., for performing particular tasks or implementing particular abstract data types. These programs, and the like, may be executed as native code or may be downloaded and executed, such as in a virtual machine or other just-in-time compilation execution environment. Typically, the functionality of the programs may be combined or distributed as desired in various implementations. An implementation of these programs may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
one or more processors configured by executable instructions to perform operations comprising:
determining an amount of pending data to copy over a network from a first storage system to a second storage system to meet a data copy requirement specified for the pending data;
determining an ingest speed for the first storage system based on a quantity of data received by the first storage system over a past period of time;
determining first computing resources associated with the first storage system and second computing resources associated with the second storage system and configured for copying the pending data from the first storage system to the second storage system;
determining a copy speed per unit of computing resource for the first computing resources and the second computing resources;
determining an estimated time to copy at least a portion of the pending data from the first storage system to the second storage system to meet the data copy requirement, the estimated time determined based at least in part on the copy speed per unit of computing resource for the first computing resources and the second computing resources, the amount of pending data, and the ingest speed; and
performing at least one action based on the estimated time.

2. The system as recited in claim 1, wherein the data copy requirement includes a recovery point objective (RPO) goal, and the estimated time is an amount of time to copy sufficient data of the pending data to achieve the RPO goal for the pending data and additional data predicted to be received subsequently by the first storage system.

3. The system as recited in claim 2, wherein:
the pending data corresponds to a plurality of data groups including a first data group and a second data group;
the first data group is associated with a first RPO goal and the second data group is associated with a second RPO goal that is different from the first RPO goal; and
the estimated time takes into consideration both the first RPO goal and the second RPO goal.

4. The system as recited in claim 1, the operations further comprising presenting a user interface that includes a virtual control selectable by a user to cause presentation of the estimated time for a selectable data copy requirement.

5. The system as recited in claim 1, wherein, based on determining that the estimated time exceeds a threshold, the at least one action includes automatically deploying one or more additional computing resources for copying the pending data from the first storage system to the second storage system.

6. The system as recited in claim 5, the operations further comprising, prior to deploying the one or more additional computing resources, performing a bandwidth test of the network to determine a throughput limit of the additional computing resources, wherein deploying the one or more additional computing resources is based at least in part on the throughput limit.

7. A method comprising:
- determining, by one or more processors, an amount of pending data to copy over a network from a first storage system to a second storage system;
- determining an ingest speed based on a quantity of data received by the first storage system;
- determining a copy speed associated with one or more first computing resources associated with the first storage system;
- determining an estimated time to copy at least a portion of the pending data to the second storage system to meet a data copy requirement, the estimated time based at least in part on the copy speed, the amount of pending data, and the ingest speed; and
- performing at least one action based on the estimated time.

8. The method as recited in claim 7, further comprising:
- determining the one or more first computing resources associated with the first storage system and one or more second computing resources associated with the second storage system, wherein the one or more first computing resources and one or more second computing resources are configured for copying the pending data from the first storage system to the second storage system; and
- determining the copy speed as a copy speed per unit of computing resource for the one or more first computing resources and the one or more second computing resources.

9. The method as recited in claim 7, wherein the data copy requirement includes a recovery point objective (RPO) goal, and the estimated time is an amount of time to copy sufficient data of the pending data to achieve the RPO goal for the pending data and additional data predicted to be received subsequently by the first storage system.

10. The method as recited in claim 9, wherein:
- the pending data corresponds to a plurality of data groups including a first data group and a second data group;
- the first data group is associated with a first RPO goal and the second data group is associated with a second RPO goal that is different from the first RPO goal; and
- the estimated time takes into consideration both the first RPO goal and the second RPO goal.

11. The method as recited in claim 7, further comprising presenting a user interface that includes a virtual control selectable by a user to cause presentation of the estimated time for a selectable data copy requirement.

12. The method as recited in claim 7, wherein, based on determining that the estimated time exceeds a threshold, the at least one action includes automatically deploying one or more additional computing resources for copying the pending data from the first storage system to the second storage system.

13. The method as recited in claim 12, further comprising, prior to deploying the one or more additional computing resources, performing a bandwidth test of the network to determine a throughput limit of the additional computing resources, wherein deploying the one or more additional computing resources is based at least in part on the throughput limit.

14. One or more non-transitory computer-readable media storing instructions that are executable by one or more processors to configure the one or more processors to perform operations comprising:
- determining an amount of pending data to copy over a network from a first storage system to a second storage system;
- determining an ingest speed based on a quantity of data received by the first storage system;
- determining a copy speed associated with one or more first computing resources associated with the first storage system;
- determining an estimated time to copy at least a portion of the pending data to the second storage system to meet data copy requirement, the estimated time based at least in part on the copy speed, the amount of pending data, and the ingest speed; and
- performing at least one action based on the estimated time.

15. The one or more non-transitory computer-readable media as recited in claim 14, the operations further comprising
- determining the one or more first computing resources associated with the first storage system and one or more second computing resources associated with the second storage system, wherein the one or more first computing resources and one or more second computing resources are configured for copying the pending data from the first storage system to the second storage system; and
- determining the copy speed as a copy speed per unit of computing resource for the one or more first computing resources and the one or more second computing resources.

16. The one or more non-transitory computer-readable media as recited in claim 14, wherein the data copy requirement includes a recovery point objective (RPO) goal, and the estimated time is an amount of time to copy sufficient data of the pending data to achieve the RPO goal for the pending data and additional data predicted to be received subsequently by the first storage system.

17. The one or more non-transitory computer-readable media as recited in claim 16, wherein:
- the pending data corresponds to a plurality of data groups including a first data group and a second data group;
- the first data group is associated with a first RPO goal and the second data group is associated with a second RPO goal that is different from the first RPO goal; and
- the estimated time takes into consideration both the first RPO goal and the second RPO goal.

18. The one or more non-transitory computer-readable media as recited in claim 14, the operations further comprising presenting a user interface that includes a virtual control selectable by a user to cause presentation of the estimated time for a selectable data copy requirement.

19. The one or more non-transitory computer-readable media as recited in claim 14, wherein, based on determining that the estimated time exceeds a threshold, the at least one action includes automatically deploying one or more additional computing resources for copying the pending data from the first storage system to the second storage system.

20. The one or more non-transitory computer-readable media as recited in claim 19, the operations further comprising, prior to deploying the one or more additional computing resources, performing a bandwidth test of the network to determine a throughput limit of the additional computing resources, wherein deploying the one or more additional computing resources is based at least in part on the throughput limit.

* * * * *